(12) United States Patent
Cai et al.

(10) Patent No.: US 10,977,293 B2
(45) Date of Patent: Apr. 13, 2021

(54) TECHNOLOGY INCIDENT MANAGEMENT PLATFORM

(71) Applicant: ROYAL BANK OF CANADA, Montreal (CA)

(72) Inventors: Yixian Cai, Toronto (CA); Amir Ghaderi, Toronto (CA); Ankit Khirwadkar, Montreal (CA); Chetana Chavda, Toronto (CA); Pei Hu, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 38 days.

(21) Appl. No.: 16/409,551

(22) Filed: May 10, 2019

(65) Prior Publication Data
US 2019/0347282 A1 Nov. 14, 2019

Related U.S. Application Data

(60) Provisional application No. 62/669,484, filed on May 10, 2018.

(51) Int. Cl.
| | |
|---|---|
| G06F 16/35 | (2019.01) |
| G06F 3/0482 | (2013.01) |
| G06F 17/18 | (2006.01) |
| G06K 9/62 | (2006.01) |
| G06F 16/332 | (2019.01) |
| G06N 5/02 | (2006.01) |
| G06F 40/216 | (2020.01) |

(52) U.S. Cl.
CPC .......... *G06F 16/358* (2019.01); *G06F 3/0482* (2013.01); *G06F 16/3329* (2019.01); *G06F 17/18* (2013.01); *G06F 40/216* (2020.01); *G06K 9/6215* (2013.01); *G06K 9/6231* (2013.01); *G06N 5/022* (2013.01)

(58) Field of Classification Search
None
See application file for complete search history.

(56) References Cited

U.S. PATENT DOCUMENTS

| | | | | |
|---|---|---|---|---|
| 10,503,827 | B2* | 12/2019 | Kurata | G06F 40/20 |
| 2014/0006861 | A1* | 1/2014 | Jain | G06N 5/022 |
| | | | | 714/26 |
| 2016/0239847 | A1* | 8/2016 | Arvapally | G06Q 30/016 |
| 2017/0140315 | A1* | 5/2017 | Cao | G06Q 10/06311 |
| 2018/0005286 | A1* | 1/2018 | Grabarnik | G06Q 30/0613 |
| 2019/0179493 | A1* | 6/2019 | Goenka | H04L 51/22 |
| 2019/0325323 | A1* | 10/2019 | Walthers | G06N 7/005 |

\* cited by examiner

*Primary Examiner* — Stella L. Woo
(74) *Attorney, Agent, or Firm* — Norton Rose Fulbright Canada LLP

(57) ABSTRACT

Embodiments described herein relation to IT incident management that can involve predictive analytics, prescriptive analytics, and descriptive analytics. An IT incident management platform can enable IT incident solution prediction using prescriptive models and natural language processing. An IT incident management platform can enable IT incident ticket volume prediction using predictive models and natural language processing. An IT incident management platform can generate visual elements for display at an interactive interface that represents data centre topology network graphs using descriptive models.

20 Claims, 23 Drawing Sheets

TECHNOLOGY INCIDENT MANAGEMENT PLATFORM

CROSS-REFERENCE

This application is a non-provisional of, and claims all benefit to, including priority to U.S. Application No. 62/669,484, entitled TECHNOLOGY INCIDENT MANAGEMENT PLATFORM, dated 10 May 2018. The contents of this document is incorporated by reference in its entirety.

FIELD

The present disclosure generally relates to the field of technology resource and network management, and more specifically, to natural language processing of resource and network management submissions.

INTRODUCTION

Embodiments described herein relate to the management of Information Technology (IT) incidents, network resources, security events, service request, and change requests.

An IT incident can relate to a service failure, unplanned interruption, reduction in the quality, or abnormal operation of a computing resource. Management systems receive and respond to incidents to attempt to minimize impact on business operation.

Processing these kind of requests is time-consuming, and resource intensive. There can be substantial overlap between requests, for example, as numerous requests may be submitted by different people in relation to a same problem. Historical requests may be stockpiled for analysis to identify potential solutions that were useful to resolve prior requests.

SUMMARY

Natural language processing techniques are described in various embodiments that are configured to computationally analyze request strings in historical IT incident tickets to identify estimated recommendations representative of solutions based on the competition analysis. The natural language processing techniques are useful to automatically identify proposed resolution activities, which can be visually represented on a graphical user interface.

The natural language processing techniques include term frequency inverse document frequency analysis and the determination of cosine similarity scores, which are generated against each of a plurality of historical incident-solution pairs stored on the data repository. The cosine similarity scores are used for establishing indices for ordering/ranking the historical incident-solution pairs (e.g., based on a level of similarity to the new incident ticket), and in some embodiments, to establish confidence scores for each of the historical incident-solution pairs.

The ordered/ranked set of historical incident-solution pairs can be used to generate an output data structure indicating, for example, the most similar historical incident-solution pairs, which can then be used to identify one or more estimated solutions for the new incident ticket. Specific technical approaches are described for automatically generating output data structures based on a received input data set representative of a new incident ticket. The output data structures encapsulate the subset of the one or more estimated solutions that are identified to be most similar to the new incident ticket.

Systems, methods, and computer readable media storing machine interpretable instructions are described in various embodiments for receiving string inputs representative of a new incident ticket and generating an output data structure representative of a subset of potential solutions selected from a plurality of potential solutions. For example, a repository may hold 50,000 historical incident-solution pairs, which can be used for similarity matching when a new incident ticket is received.

In a first aspect, the system includes a processor operating in conjunction with computer memory. The processor is configured to provide a data receiver, a pre-processing engine, and a natural language processing engine.

The data receiver is configured for receiving the string inputs representative of the new incident ticket, the new incident ticket including at least a title field and a description field.

A pre-processing engine is configured to concatenate the title field and the description field of the new incident ticket, and to remove low value words from the concatenated title field and description field. Low value words can be identified, for example, as stop words based on a natural language processing library.

A natural language processing engine is provided that is configured to perform term frequency inverse document frequency analysis across against a set of historical incident-solution pairs stored on a data repository and the pre-processed concatenated title field and description field, and determine a plurality of cosine similarity scores each corresponding to the pre-processed concatenated title field and description field mapped against a historical incident stored on the data repository.

An ordered list of closest matching historical incidents of the set of historical incident-solution pairs stored on the data repository is generated, ordered by the determined cosine similarity scores; The subset of potential solutions is selected from the plurality of potential solutions based on a pre-defined number of closest matching historical incidents from the ordered list of the closest matching historical incidents.

The output data structure is generated to encapsulate the subset of potential solutions selected from the plurality of potential solutions.

In accordance with another aspect, the cosine similarity is determined using a hyper parameter "n-gram range (1,3)".

In accordance with another aspect, the cosine similarity scores are further processed to generate one or more corresponding confidence scores.

In accordance with another aspect, the processor is further configured to provide a repository update engine that is configured to periodically retrieve, from one or more incident data storage devices, data elements representing every incident-solution pair that has occurred during a period, process the data elements to concatenate title and description fields of the data element and to remove one or more low value words, and to update the repository with the processed data elements.

In accordance with another aspect, the processor is further configured to provide a decision support graphical user interface rendering engine, the decision support graphical user interface rendering engine configured to generate one or more control signals that control a display of a computing device to render a graphical user interface including at least one or more visual interface elements including textual data corresponding to the output data structure representative of the subset of potential solutions selected from the plurality of potential solutions.

In accordance with another aspect, the string inputs representative of the new incident ticket include natural language strings including at least a portion indicative of an error code, and wherein the graphical user interface is rendered including, for each potential solution of the subset of potential solutions, a first textual graphical element directed to the description string of the incident, a second textual graphical element directed to the title string of the incident, and a third textual graphical element directed to the solution string of the incident.

In accordance with another aspect, the string inputs representative of the new incident ticket are received from a chatbot interface.

In accordance with another aspect, the low value words are stored on a reference data structure.

In accordance with another aspect, a visual characteristic of the first textual graphical element, the second textual graphical element, or the third textual graphical element corresponding to each potential solution is modified based on the cosine similarity score corresponding to the potential solution.

In accordance with another aspect, the visual characteristic is selected from a group consisting of: font size, font color, background color, and opacity level.

In accordance with another aspect, the system is configured to automatically select and invoke a data process representative of a remediation function based on the potential solution having the highest cosine similarity score.

In accordance with an aspect, there is provided an incident management platform for incident solution prescription with a processor and a memory storing machine executable instructions to configure the processor to: process text fields of IT incident tickets using a natural language processor; update knowledge base for the natural language processor using machine learning, prescriptive models, and the processed text fields of the IT incident tokens; process a new IT incident token using the natural language processor; generate a prescriptive solution for the new IT incident token using the knowledge base and the prescriptive models.

In some embodiments, the natural language processor processes the new IT incident token using a text similarity process to compare the new IT incident token with the knowledge based updated with the processed text fields of the IT incident tokens.

In some embodiments, the processor is configured to generate a confidence score using the text similarity process.

In some embodiments, the processor is configured to output the prescriptive solution for display at an interface with a visual element indicating the prescriptive solution.

In some embodiments, the processor is configured to output the prescriptive solution to a virtual agent.

In accordance with an aspect, there is provided an incident management platform for incident ticket volume prediction having a processor and a memory storing machine executable instructions to configure the processor to: process text fields of IT incident tickets for an application using a natural language processor, the IT incident tickets having an application code corresponding to the application; update a prediction model using machine learning and the processed text fields of the IT incident tokens; generate a volume prediction for incidents using the prediction model.

In some embodiments, the processor is configured to update an operational risk model using the processed text fields of the IT incident tokens and generate an operational risk prediction using the operation risk model.

In some embodiments, the processor is configured to detect user access anomalies or intrusions using event detection.

In some embodiments, the processor is configured to process the text fields of IT incident tickets by removing outliers.

In some embodiments, the prediction model is a neural network regression model.

In accordance with an aspect, there is provided an interface platform for visualizing data centre network topology having a processor and a memory storing machine executable instructions to configure the processor to: process infrastructure inventory data received from a plurality of infrastructure resources to extract network metadata and identify relationships or links between infrastructure components for an application; generate an application topology graph data structure using the processed infrastructure inventory data, the graph data structure having nodes for the infrastructure components for the application and connections between the nodes for the relationships or links; generate visual elements of the application topology graph data structure; and render the visual elements as part of an interface to display an interactive three-dimensional representation.

In some embodiments, the processor is configured to process change management records using a natural language processor, link the change management records to the application topology graph data structure, update the visual elements to indicate the change management records.

In some embodiments, the processor is configured to determine that a first change management record relates to a first application and a second application, generate the application topology graph data structure to indicate a link between the first application and the second application.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DETAILED DESCRIPTION

Natural language processing techniques are described in various embodiments that are configured to computationally analyze request strings in historical IT incident tickets to identify estimated recommendations representative of solutions based on the competition analysis. The natural language processing techniques are useful to automatically identify proposed resolution activities, which can be visually represented on a graphical user interface.

The natural language processing techniques include term frequency inverse document frequency analysis and the determination of cosine similarity scores, which are generated against each of a plurality of historical incident-solution pairs stored on the data repository. The cosine similarity scores are used for establishing indices for ordering/ranking the historical incident-solution pairs (e.g., based on a level of similarity to the new incident ticket), and in some embodiments, to establish confidence scores for each of the historical incident-solution pairs.

The ordered/ranked set of historical incident-solution pairs can be used to generate an output data structure indicating, for example, the most similar historical incident-solution pairs, which can then be used to identify one or more estimated solutions for the new incident ticket.

Embodiments of methods, systems, and apparatus are described through reference to the drawings.

Figure 1:
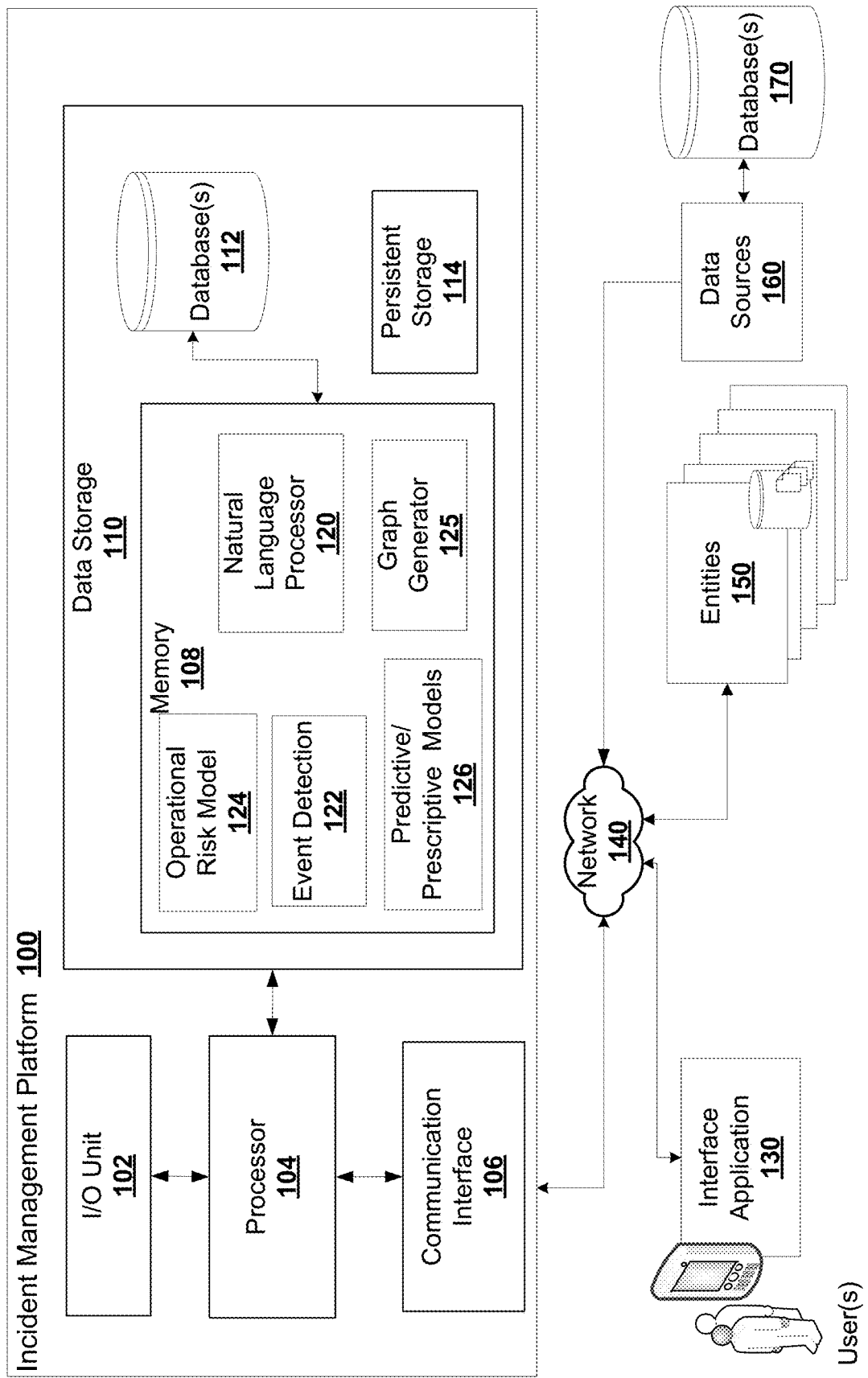
FIG. 1 is a schematic diagram of incident management platform, according to some embodiments.

FIG. 1 is a schematic diagram of incident management platform 100 according to some embodiments. The incident management platform 100 is a computer implemented platform that is operable on a processor in conjunction with computer memory and data storage. The platform 100 can enable IT incident management and can involve predictive analytics, prescriptive analytics, and descriptive analytics. The platform 100 can enable IT incident solution prediction using prescriptive models 126 and natural language processor 120. The platform 100 can enable IT incident ticket volume prediction using predictive models 126 and natural language processor 120. The platform 100 can generate visual elements for display at an interactive interface that represents data centre topology network graphs using descriptive models.

In particular, the incident management platform 100, in some embodiments, is provisioned as part of an artificial intelligent virtual assistant service. The incident management platform 100, in an aspect, is adapted to receive and track IT incident tickets, for example, through an IT service management tool.

These tickets are received in the form of data structures encapsulating text strings, and may be formatted such that natural language questions are posed representing potential IT incidents. The text strings, for example, can contain text/string token portions which, in combination with other tokens or individually, may indicate a sentiment or a type of query being raised by the user. The text strings can also include identifying information, such as error codes, device names, time of occurrence, programs or applications which were operating when the incident occurred, among others. For example, a text string may also include a "core dump", which includes contents of a memory storage that can be used to aid debugging efforts.

Incident management platform 100, in some aspects, is configured to process data relating to an organization's technological infrastructure using predictive/prescriptive models 126 and event detection 122 to generate predictions/prescriptions for incidents and system outages or degradation of infrastructure and automatically prescribe solutions for incident predictions.

Incident management platform 100 can use machine learning processes to identify hidden relationships or patterns connecting different data points and trigger execution on future similar scenarios. Incident management platform 100 can enable both business and IT users to augment human capabilities. Incident management platform 100 uses operational risk models 124 to predict operational risk events that could cause impact from a financial, reputational, operational or regulatory perspective. Incident management platform 100 models predictive models 126 and event detection 122 to detect user access anomalies or intrusion detection for infrastructure resources.

Incident management platform 100 connects to interface application 130, entities 150, and data sources 160 (with databases 170) using network 140. Entities 150 can interact with the platform 100 to provide input data and receive output data. Network 140 (or multiple networks) is capable of carrying data and can involve wired connections, wireless connections, or a combination thereof. Network 140 may involve different network communication technologies, standards and protocols, for example. The interface application 130 can be installed on user device to display an interface of visual elements that can represent security alerts and chains of events.

The platform 100 implements artificial intelligence (AI) using machine learning processes to generate predictions of the most likely outcomes in any IT or business scenario. The platform 100 augments human capabilities, increases productivity and performance; and can potentially reduce cost and risk. The platform 100 uses a combination of analytics capabilities at different stages of IT project delivery pipeline to address wider array of problems more effectively. The platform 100 facilitates a culture of data driven decision making.

The platform 100 includes an I/O Unit 102, a processor 104, communication interface 106, and data storage 110. The processor 104 executes instructions in memory 108 to implement aspects of processes described herein. The processor 104 executes instructions in memory 108 to configure natural language processor 120, event detection 122, operational risk model 124, predictive/prescriptive models 126, graph generator 125 for performing functions described herein.

The communication interface 106, in some embodiments, is a data receiver configured for receiving the string inputs representative of the new incident ticket, the new incident ticket including at least a title field (e.g., database error) and a description field (e.g., "How do I fix inc0304036").

The platform 100 can implement incident solution prescription using processor 104 and memory 108 storing machine executable instructions to configure the processor 104 to process text fields of IT incident tickets using a natural language processor 120.

The processor 104 is configured to provide a pre-processing engine configured to concatenate the title field and the description field of the new incident ticket, and to remove low value words from the concatenated title field and description field. The pre-processing is adapted to aid in ensuring that comparable vectors can be formed from the incident ticket string, especially after resolutions are identified and later incorporated into the incident-solution pair repository. In some embodiments, the vectors are extended with additional fields for derivative or metadata-based data elements.

For example, derivative elements can include one or more derived sentiment scores, and metadata-based data elements can include timestamps, device names, requesterIDs, business unit, computing device group, active directory groups, among others.

The generation of vectors can include tokenized words, or portions of words, or characters. In some embodiments, the vectors include n-grams, which are a contiguous sequence of character elements within a string. An example n-gram as a hyperparameter value that was found to be particularly useful was n-gram range(1,3).

The processor 104 updates knowledge base for the natural language processor 120 using machine learning, prescriptive models 126, and the processed text fields of the IT incident tokens. The processor 104 can process a new IT incident token using the natural language processor and generate a prescriptive solution for the new IT incident token using the knowledge base and the prescriptive models 126.

In some embodiments, the natural language processor 120 processes the new IT incident token using a text similarity process to compare the new IT incident token with the knowledge based updated with the processed text fields of the IT incident tokens. In some embodiments, the processor 104 is configured to generate a confidence score using the text similarity process. In some embodiments, the processor 104 is configured to output the prescriptive solution for display at an interface application 130 with a visual element indicating the prescriptive solution.

The natural language processor 120 is a natural language processing engine configured for identifying ordered subsets of potential solutions that are computationally likely to correspond to a new incident. The natural language processor 120 is adapted to utilize string matching and cosine similarity to establish computational metrics upon which to gauge similarity.

As the string corresponding to the new incident is likely not an exact match to any historical incident, both the new incident string and historical strings can be converted into vector representations. Term frequency inverse document frequency analysis is performed across against a set of historical incident-solution pairs stored on a data repository and the pre-processed concatenated title field and description field to establish an initial set of vectors for analysis.

Term frequency inverse document frequency analysis is a weighted word process which helps in identifying word patterns (bigrams and trigrams) from a document/text. N-gram is a hyper parameter which is used in the term frequency inverse document frequency analysis approach to specify the word count range. N-gram range(1,3) specifies up to 3 word combination for the TFIDF.

Applicants, through experimentation, have identified (1,3) is a useful optimized word count for IT ticket incident management strings. The term frequency inverse document frequency analysis approach prepares the input for the next approach being used, which is cosine similarity.

For example: The n-gram (1, 3) would look for three consecutive words. From the input string, it would look for the words "The", "The incident" and "The incident is" as individual groups of word and rank them in a matrix based on their frequency in the document.

TABLE 1

Example n-gram analysis

| Incidents\Ngrams | The | The incident | The incident is |
|---|---|---|---|
| Incident1 | 0.2 | 0.5 | 0.4 |
| Incident2 | 0.3 | 0.2 | 0 |
| Incident3 | 0.5 | 0.1 | 0 |
| Incident4 | 0.7 | 0.5 | 0.5 |
| Incident5 | 0.2 | 0 | 0 |
| Incident6 | 0.8 | 0.6 | 0.3 |
| NewIncident | 0.8 | 0.7 | 0.6 |

Each row here is a unique vector which will be used as an input for the cosine similarity. The vectors can include, for example, specific terms, term frequency, inverse document frequency, among others, transformed from the new incident string as well as the historical incident-solution pairs.

The natural language processor 120 is configured to determine a plurality of cosine similarity scores, each corresponding to the pre-processed concatenated title field and description field mapped against a historical incident-solution pair stored on the data repository. The cosine similarity scores are established as a measure of similarity between two non-zero vectors of an inner product space.

Cosine similarity is a distance approach which determines which strings are most closely related. The above results are plotted in a multi-dimensional space graph based on the n-grams, establishing a constellation of points. In some embodiments, a number of incidents which are the closest are selected as potentially relevant historical incident-solution pairs selected as a subset from all of the historical incident-solution pairs.

Cosine similarity is used to estimate a similarity between different data elements, and can be extrapolated into a confidence score of a level of similarity. The confidence score may be, in some embodiments, refined over time as users provide feedback as to whether a proposed solution from the platform was useful in resolving the incident ticket.

Accordingly, a data structure (e.g., a database table) can be generated where, for a specific new incident, a plurality of historical incident tickets (and their corresponding solutions as incident-solution pairs) can each be assigned a similarity score and in some embodiments, a confidence score for a potential match. The data structure elements may be sorted by the similarity score and used to generate an ordered list of closest matching historical incidents of the set of historical incident-solution pairs stored on the data repository, ordered by the determined cosine similarity scores.

The natural language processor 120 determines the subset of potential solutions selected from the plurality of potential solutions based on a pre-defined number of closest matching historical incidents from the ordered list of the closest matching historical incidents, which are then utilized to generate the output data structure representative of the subset of potential solutions selected from the plurality of potential solutions.

The prediction/prescriptive models 126, in some embodiments, can then utilize the output data structure to identify one or more prescriptive actions. The one or more prescriptive actions can include solution strings which can be interpreted by an agent who then takes corrective action (e.g., by selecting to initiate a corresponding data process).

Figure 2:
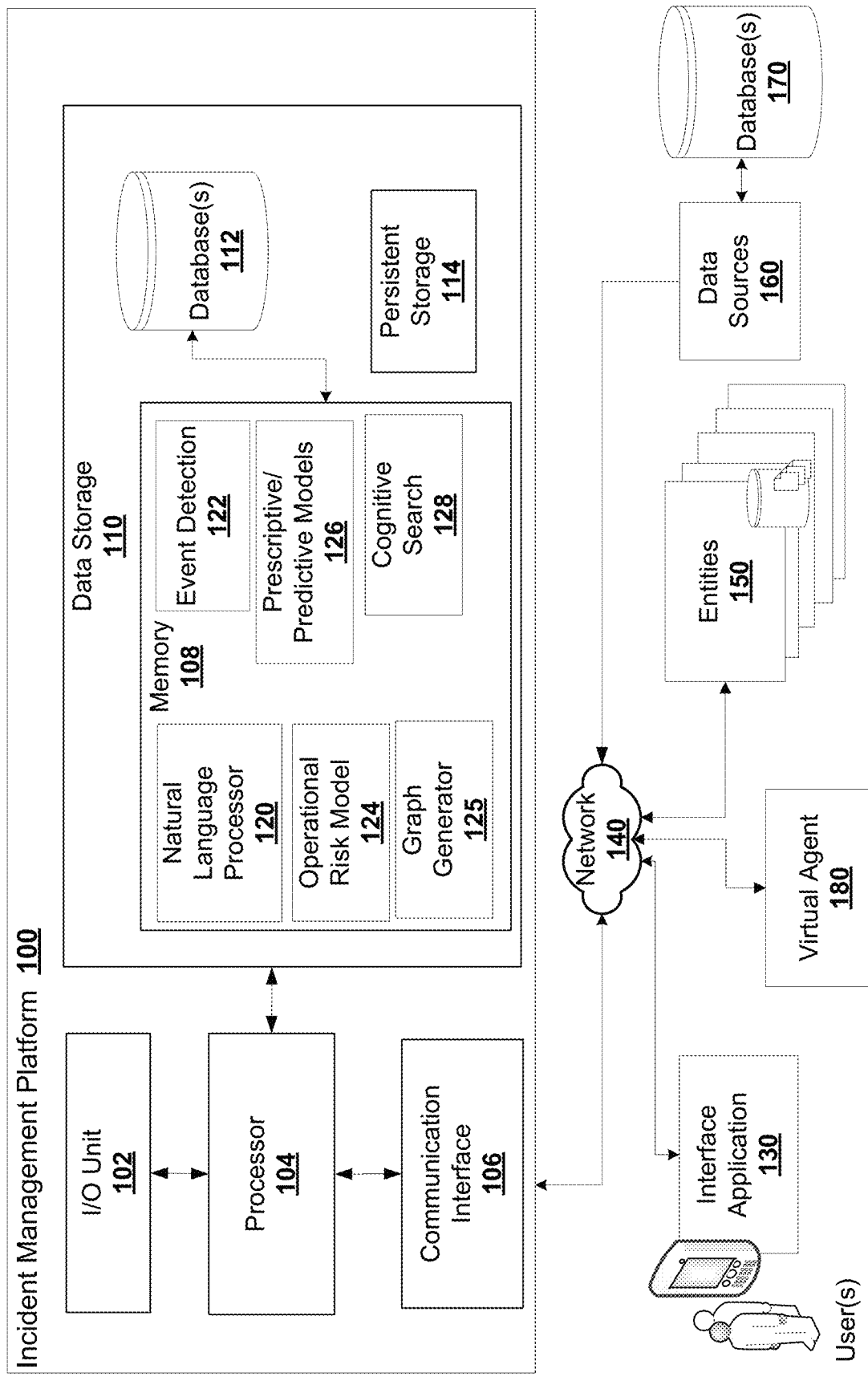
FIG. 2 is a schematic diagram of incident management platform, according to some embodiments.

In some embodiments, the processor 104 is configured to output the prescriptive solution to a virtual agent 180 (FIG. 2). In this example, the virtual agent 180 may then provide a graphical user interface or other output to indicate to the user what a potential solution is, and the data structure of potential solutions can be traversed to provide potential alternate solutions, provided such solutions have confidence scores that are above a pre-defined threshold. For example, the virtual agent 180 may receive an incident string "What to do for error code 0x22FFFE?", and upon traversing historical incident tickets, respond with "There have been three successful resolutions of similar problems. The most likely solution is to allocate additional memory to the page file".

In another embodiment, the prediction/prescriptive models 126, controls the processor 104 to automatically initiate or otherwise invoke data processes for providing a solution. In the earlier example, the system could automatically invoke a data process to allocate additional memory to the page file to address the error.

In some embodiments, the platform 100 enables incident ticket volume prediction and the processor 104 can process text fields of IT incident tickets for an application using the natural language processor 120. The IT incident tickets have an application code corresponding to the application. The processor 104 can update a prediction model 126 using machine learning and the processed text fields of the IT incident tokens.

The processor 104 can generate a volume prediction for incidents using the prediction model 126. The processor 104 can update the operational risk model 124 using the processed text fields of the IT incident tokens and generate an operational risk prediction using the operation risk model 124. In some embodiments, the processor 104 is configured to detect user access anomalies or intrusions using event detection. In some embodiments, the processor 104 is configured to process the text fields of IT incident tickets by removing outliers. In some embodiments, the prediction model 126 is a neural network regression model.

In some embodiments, the platform 100 enables generation and interactive updates for an interface application 130 for visualizing data centre network topologies. The processor 104 can process infrastructure inventory data received from a plurality of infrastructure resources to extract network metadata and identify relationships or links between infrastructure components for an application.

The processor 104 can generate an application topology graph data structure using the processed infrastructure inventory data and the graph generator 125. The graph data structure has nodes for the infrastructure components for the application and connections between the nodes for the relationships or links. The processor 104 can generate visual elements of the application topology graph data structure. The processor 104 can render the visual elements as part of an interface to display an interactive three-dimensional representation.

In some embodiments, the processor 104 is configured to process change management records using the natural language processor 120 and, link the change management records to the application topology graph data structure. The processor 104 can update the visual elements to indicate the change management records.

In some embodiments, the processor 104 is configured to determine that a first change management record relates to a first application and a second application. The graph generator 125 generates the application topology graph data structure to indicate a link between the first application and the second application. Other features are described herein.

The platform 100 uses machine learning processes to generate prediction models 126 of the most likely outcomes in IT or business scenarios. The platform can augment human capability, boost productivity and performance, and reduce cost and risk. The platform 100 can use a combination of analytic capabilities at different stages in the incident management process to predict incidents and prescribe solutions effectively the platform 100 different models 124, 126 that can be predictive models 126, prescriptive models, and descriptive models.

The platform 100 can implement predictive analytics. The platform 100 can implement incident volume prediction. The platform can leverage time series analysis of historical incident tickets using natural language processor 120 to predict a volume of tickets for proactive application support planning. The platform 100 can enable proactive outage prevention and early problem detection to enable faster repair time and minimize business impact. For example, the platform 100 can use a predictive model 126 based on neural network regression data structures for example. The platform 100 can implement outage predictors and indicators at interface application 130 or virtual agent 180.

The platform 100 can process data using natural language processor 120 and operational risk model 124 to understand downstream impact of outages, unexpected events, or other changes based of upstream incidents for changes. The platform 100 can implement server performance anomaly detection using event detector 122 to predict outages and degradation of infrastructure and correct calibration of alerts using K means clustering for example. The platform 100 can implement unusual or anomalous trade detection using event detector 122 by flagging and identifying irregular trades using a clustering process for example. The platform 100 can implement margin call response classification. The platform can process data using natural language processor 120 and machine learning to classify counterparty response on merchant calls to determine whether the response is yes or no and can also determine the sentiment of the response.

The platform 100 can implement employee feedback box sentiment analytics using natural language processor 120 to provide sentiment analysis on employee feedback text data. The platform 100 can implement trade book and sales book predictive analytics by applying predictive models 126 two trade book or sales book data using machine learning. The platform 100 can generate visualization of hotspots in application codes caused by changes. The platform 100 can generate visualizations for heat maps for predicting emerging hotspots in the code caused by changes and proactively guide testing teams to focus on these hotspots. The platform 100 can predict defects that are likely to cause escalation in production to enable predictive maintenance.

The platform 100 can implement prescriptive analytics. The platform 100 can implement a root cause prescription process using a virtual agent 180 and natural language processor 120. The platform 100 can leverage text mining from incident ticket titles and descriptions to learn from past solutions and predict root cause of future incidents and issues. This can reduce triage time and speed up resolution time to minimize business impact. The platform 100 can build models to answer questions received at virtual agent 180 output solutions to problems and incidents posed in natural language at virtual agent 180.

The platform 100 enables a continuous expansion of the knowledge base used by models. The platform 100 can implement assignment group recommendation engines. The platform 100 can analyse past activity fields of tickets to understand the ticket processing flow from one assignment group to another the platform 100 can identify bottlenecks assignment groups in the workflow and generate a ticket assignment recommendation to automatically assign tickets to the true related assignment group to save processing time. This can be achieved using network analysis, clustering processes and natural language processor 120.

The platform 100 can implement descriptive analytics. The platform 100 can generate visual elements to populate an interface 130 and the visual elements can represent a network diagram of server application apology and compliance metadata. The platform 100 can generate visualizations of key relationships between infrastructure components, application components, and business processes to identify bottlenecks or hotspots. The visualizations can be generated from server compliance status data and different reports. The platform 100 can generate consolidated server information to provide a consolidation of different server data sources using data wrangling techniques.

The platform 100 can implement incident ticket keyword analysis for keyword and text analytics and classification of incident tickets to drill down on trending keywords within a defined time using natural language processor 120. The platform 100 can enable a server decommission feasibility analysis by flagging servers a low or zero average CPU utilization using data wrangling and classification techniques.

The platform 100 can implement a top call driver analysis to identify top topics per service or assignment groups using natural language processor 120, nonnegative matrix factorization, and latent Dirichlet analysis. The platform 100 can implement article summary processes to summarize articles and papers while still maintaining the core ideas using natural in which processor 120. The platform 100 can implement incident lifecycle processes and generate process visualization to analyse tickets, for example, assessing open to closing times and to identify ticket assignment groups that have abnormal ticket processing times using descriptive data analytics and clustering techniques.

The platform 100 can assess application file dependency and conduct network analysis to analyse knowledge articles, emails, service or incident tickets to understand the file, data to application, job mapping apology using network analysis and natural language processor 120.

Event detection 122 can interact with operational risk model 124 (which may be prescriptive and descriptive models) to identify incidents, network resources, security events, service request, and change requests from data received at platform 100 via entities 150 or data sources 160.

Event detection 122 can relate to user access anomaly detection, for example. The graph generator 125 can process events to generator infrastructure or data centre topologies with visual elements corresponding to events. The platform 100 can generate an interface with the visual elements for display at interface application 130 as a predictive dashboard.

The platform 100 can aim to prevent business impact resulting from IT system problems or business process issues. Proactive outage prevention and early problem detection can enable faster mean repair time is critical to prevent any business impact.

IT Incident Management data is recorded and tracked through IT incident tickets using an IT Service Management tool, for example, and the ticket data can be provided to the platform 100. These tickets can include data relating to the incident such as title, description, and resolution in addition to the automatically generated metadata.

A typical IT support team might have to manual review hundreds of these tickets per week, which makes it difficult for support analyst to timely analyze a new incident and compare to the past incidents to find similarities in the issue. The platform 100 can automate and enhance this process using natural language processor 120, for example.

The platform 100 uses natural language processor 120 to process relevant text fields in the historical IT incident tickets in order to prescribe solutions for every new incident received by platform 100. The platform 100 uses natural language processor 120 to prescribe solutions from historical incident ticket titles and descriptions.

The platform 100 implements an automatic expansion of the knowledge base (of natural language processor 120) to provide a self-learning architecture. The platform 100 can generate an interface with visual elements for IT Incident Solution Prescription support and automatically respond to new IT incidents faster in turn minimizing business impact.

IT support teams might not be able to anticipate the volume of IT incident tickets, making it difficult for business users to meet their business objectives or to manage operational risk; further it becomes challenging for support managers to plan their resources properly. This becomes problematic when planning support personnel and infrastructure capacity around different international holidays for a global bank.

The platform 100 can use event detection 122 and predictive models 126 to predict a volume of IT incidents for a given application based on historical IT incident ticket data. This can enable pre-emptive outage prevention and early problem detection enables faster mean repair time and eventually reduced number of IT incidents raised.

IT operations can produce huge amounts of structured and unstructured data for its components and applications. The massive amount of data IT operations produces can have several characteristics that can be used for implementation of advanced analytics to assist in minimizing disruption and maximizing efficiency.

For example, IT Operations produces enormous amounts of metric data for its components as well as service data logged in ITSM tools. There can be strong correlations between outages of certain components which may or may not be difficult to identify without help of machine learning and artificial intelligence. Even small amounts of time added to outages due to inefficiency can lead to larger costs to the firm. Data which may be helpful to understand when correlated might be separate and reside in different groups.

Embodiments described herein can apply advanced data analytics with strong descriptive, prescriptive, and predictive capabilities to provide benefits to the IT Operations within CMIT. For example, there can be proactive outage prevention and reduction of outage time. There can be an anomaly and early problem detection. This can prevent and minimize business impacts. In order to achieve this, embodiments described herein may enable fast and simple data model development.

There can be an efficient data model management (repository for data models storage and sharing, user access management etc.). There can be efficient and secure data model deployment in production. There can be extensible toolsets/features/framework coming along with data modelling that does more than just data modelling/analysis (such as the flexibility of adding extra logic to data analysis results).

Embodiments described herein can provide computing components for data analysis, data management, statistical analysis, data mining, machine learning, text analytics, and data visualization. Embodiments described herein can provide an intuitive GUI interface application 130 for the creation of workflows. Embodiments described herein can enable rapid transformation of diverse unstructured data into actionable insights where machine learning processes data to build a predictive model 126.

Embodiments described herein can be used within IT Operations, Research and GIB space for applications and underlying infrastructure components. Embodiments described herein can provide predictive analytics for proactive outage prevention and early problem detection to enable faster mean repair time and to prevent business impact. An organization can be impacted by changes unknown to us or known late in the process to avoid the actual impact. Severity 1 and/or Severity 2 incidents that result from this unpredictability are costly. These incidents can be reduced and in some cases avoided altogether using embodiments herein resulting in stable infrastructure, applications, business continuity and reduced operational risk.

Embodiments described herein can have a desktop component (e.g., interface application 130) that is used to connect into a server application (e.g., platform 100). The Desktop interface application 120 connects with the server application over network 140. The server has the ability to connect with other data sources 160 or database applications (e.g., Teradata, SQL/Server, etc.) for querying data that the user has privileges for in the form of models or statistical flow. The models 124, 126, can be run on a user device using the Desktop tool, or published to the server to run there. Embodiments described herein can provide code or logic in the form of statistical models/workflows that can be securely stored at data storage 110 of platform 100.

Embodiments described herein can provide build predictive and prescriptive models 124, 126 built and tuned using supervised and unsupervised machine learning processes.

Example uses cases include: (i) Time Series Analysis; (ii) Volume of Incidents Prediction; (iii) Root Cause Analysis; (iv) Prescriptive Analytics and Knowledge Management; (v) chat bot enablement for analysts; (vi) Network Analysis; (vii) Components Management; (viii) Anomaly Detection; (ix) Failure detection and prediction; (x) Integration with an Enterprise communication platform; (xi) Ticket Quality Improvement; (xii) Derivatives Regulatory Trade Reporting for rejection and remediation prediction.

The platform 100 can leverage Time Series Analysis of historical SM9 incident tickets using prediction models 126 to predict volume of incidents for proactive application support planning. The platform 100 can enable Infrastructure Capacity Planning using visual elements for infrastructure topology. The platform 100 can generate alerts for proactive outage prevention and early problem detection to enable faster mean repair time and to prevent business impact. The platform 100 can leverage text mining from SM9 incident ticket titles and descriptions to learn from past solutions and predict root cause of future issues and incidents; reduce triage time and speed up resolution time to minimize business impact.

The platform 100 can build models to answer questions for solutions to problems/incidents posed in natural language processor 120. The platform 100 can provide for continuous expansion of knowledge base for L1/L2 support analysts to reduce triage and resolution cycle time. The platform 100 can generate visualization of the key relationships between infrastructure components, source systems, application components, and business processes. Identify bottlenecks or hotspots in process. The platform 100 can understand downstream impact of outages, unexpected events, or other changes based on upstream incidents or changes. The platform 100 can predict outages/degradation of infrastructure and correct calibration of alerts.

The data models 124, 126 can be published in PMML, C/C++, JAVA, C#, SQL, SAS to integrate with external code, for example. The platform 100 also supports Python, R, C#, VB as scripting languages in the model workspace, to enrich the functionality of the model workspace.

The platform 100 has the ability to connect with other data sources 160 or database 170 applications (e.g. Teradata, SQL/Server, etc.) for querying data that the user has privileges for. The query facilities can be additionally enhanced by options to process data from remote server in-place without having to import them and create a local data file. This can be useful for processing extremely large data files that exceed the storage capacity of the local device.

The In-place Database Processing (IDP) of the platform 100 facilities can enable data access directly on the server, unlike other methods that can require importing the data first into a data file on the local computer before it can be processed. This direct mode of accessing data via the optional IDP component can offer performance gains over the traditional data access method—especially when the data set is very large—because in many circumstances, using IDP makes it possible for the data to be read only once.

The traditional method, on the other hand, requires one pass through the source data set in order to import it to the local computer, and then at least one more pass (through the already imported data set on the local device) to perform the actual analyses.

The platform 100 can also write certain information computed by the program back to the original input data file or database and, thus, integrate computed statistics into an existing database or data warehouse. For example, the rapid deployment of models 124, 126 of platform 100 provides the ability to write computed statistics (predictions, predicted classifications, classification probabilities, residuals) back into the current input data file; and the capability to, for example, merge classification probabilities computed by various models into an existing database or data warehouse is extremely useful in the context of data mining applications to deploy models 124, 126 for extremely large data sets.

The platform 100 can provide strong community support. The platform 100 can have extremely powerful data wrangling/preprocessing features. The platform 100 can have a wide variety of data visualization options.

The platform 100 can have comprehensive documentation support. The platform 100 can facilitate ease of use and model 124, 126 customization. The platform 100 can provide in-database analytics and comprehensive user/data/project access/storage management at the enterprise level. The platform 100 can provide model live scoring as a service. The platform 100 can provide model output monitoring and alerting. The platform 100 can enable seamless integration with Internet of Things devices, for example.

The I/O unit 102 can enable the incident management platform 100 to interconnect with one or more input devices, such as a keyboard, mouse, camera, touch screen and a microphone, and/or with one or more output devices such as a display screen and a speaker.

The processor 104 can be, for example, a microprocessor or microcontroller, a digital signal processing (DSP) processor, an integrated circuit, a field programmable gate array (FPGA), a reconfigurable processor, or combinations.

Memory 108 may include a suitable combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g. graph database), and persistent storage 114.

The communication interface 106 can enable the incident management platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these.

Incident management platform 100 can be operable to register and authenticate users (using a login, unique identifier, and password for example) prior to providing access to applications, a local network, network resources, other networks and network security devices. The platform 100 can connect to different machines or entities 150.

The data storage 110 may be configured to store information associated with or created by the platform 100. Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files, and so on.

FIG. 2 is a schematic diagram of incident management platform 100 with an interactive virtual agent 180 according to some embodiments. The platform 100 can implement aspects of the processes described herein. The platform 100 includes components as described in relation to in FIG. 1. Incident management platform 100 can also include a virtual agent 180 and the processor 104 can execute instructions in memory 108 to configure natural language processor 120, and cognitive search 128. The virtual agent 180 can implement a "chatbot" to provide output based on predictive/prescriptive model 126. The virtual agent 180 can integrate with natural language processor 120 for text analysis and summary report generation. The virtual agent 180 can integrate with cognitive search 128 to enable processing of search requests and retrieval of search results. The virtual agent 180 can integrate with natural language processor 120 for margin call videos.

The platform 100 involves cognitive automation by combining machine learning and deep learning (as part of predictive model 126 and operational risk model 124) with natural language processor 120 to provide output at an interactive virtual agent 180 (which can be a chatbot, for example). The platform 100 using computing processes with self-learning systems that use data mining, pattern recognition and natural language processing to mimic the way the human brain works. The platform 100 provides an automated IT system that is capable of resolving incidents without requiring human assistance.

The platform 100 can use prescriptive, predictive, and descriptive analytics to process and identify IT issues with a particular time frames. The platform 100 can implement a virtual agent 180 interact with end-users using natural language processor 120. The platform can use graph generator 125 to generate visual elements representing a data topology of infrastructure or data centres. The visual elements can represent centres around the world and their corresponding systems and applications.

The visual elements can be displayed interface application 130. The user can interact with different components of the interface application 132 drill down on different kinds of information or events. This can allow for faster monitoring and can also include visual elements representing different predictive metrics. The platform 100 has data storage 120 and processing can be done with in memory elements to avoid transferring and moving the data. The visual navigator of infrastructure components allows for real-time detection and prediction of vulnerabilities. The virtual agent 180 can display condensed summaries of a large amount of data and can link the summaries to predictive models 126 and operational risk models 124 to identify risk events and provide summaries of those events. The virtual agent 180 can have a search interface to receive inquiries and provide responses. The virtual agent 180 can receive anomaly detection alerts such as a system access from inappropriate device or location.

Figure 3:
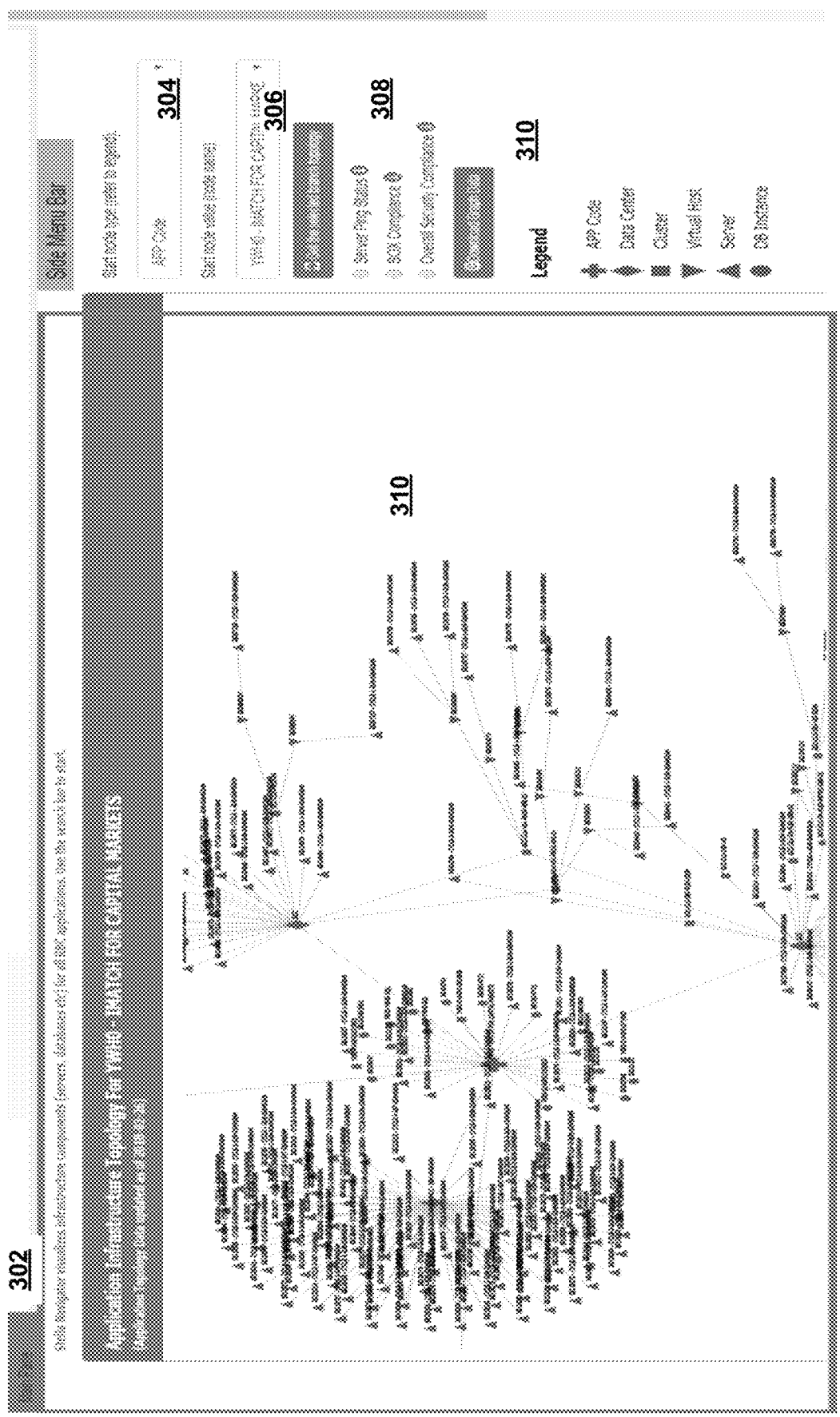
FIG. 3 is an example interface with visual elements representing an infrastructure topology, according to some embodiments.

The platform 100 can enable incident management by processing text data relating to different incidents using natural language processor 120. The platform FIG. 3 is an example interface 300 with visual elements representing an infrastructure (e.g. data centre) topology 310 according to some embodiments. The interface 300 includes a top menu bar 302 that includes different applications including a data centre topology navigator to generate and display visual elements for infrastructure components. The interface 300 includes a start node type 304 indicia to customize the start point (or node) of the network infrastructure topology 310 diagram displayed as visual elements. Example start nodes include application code, data centre, cluster, virtual host, server, and database instance. The interface 300 includes a start node value 306 indicia to customize the start point (or node) to a specific value.

The interface 300 includes select branch topology indicia 308 to refresh the network topology diagram with a customize start point. The interface 300 includes a server ping status indicia to see the online/offline status of an application server. The interface 300 includes an SOX compliance indicia to visualize SOX compliance reporting status if applicable.

The interface 300 includes an overall security compliance indicia to trigger the display of visual elements for security compliance reporting for an application server or database. The interface 300 includes graph data export 310 indicia to export data for the visual elements of the network topology diagram in different formats. The interface 300 includes a search field and a legend. The interface 300 includes interactive elements to zoom in and out on different visual elements.

Figure 4:
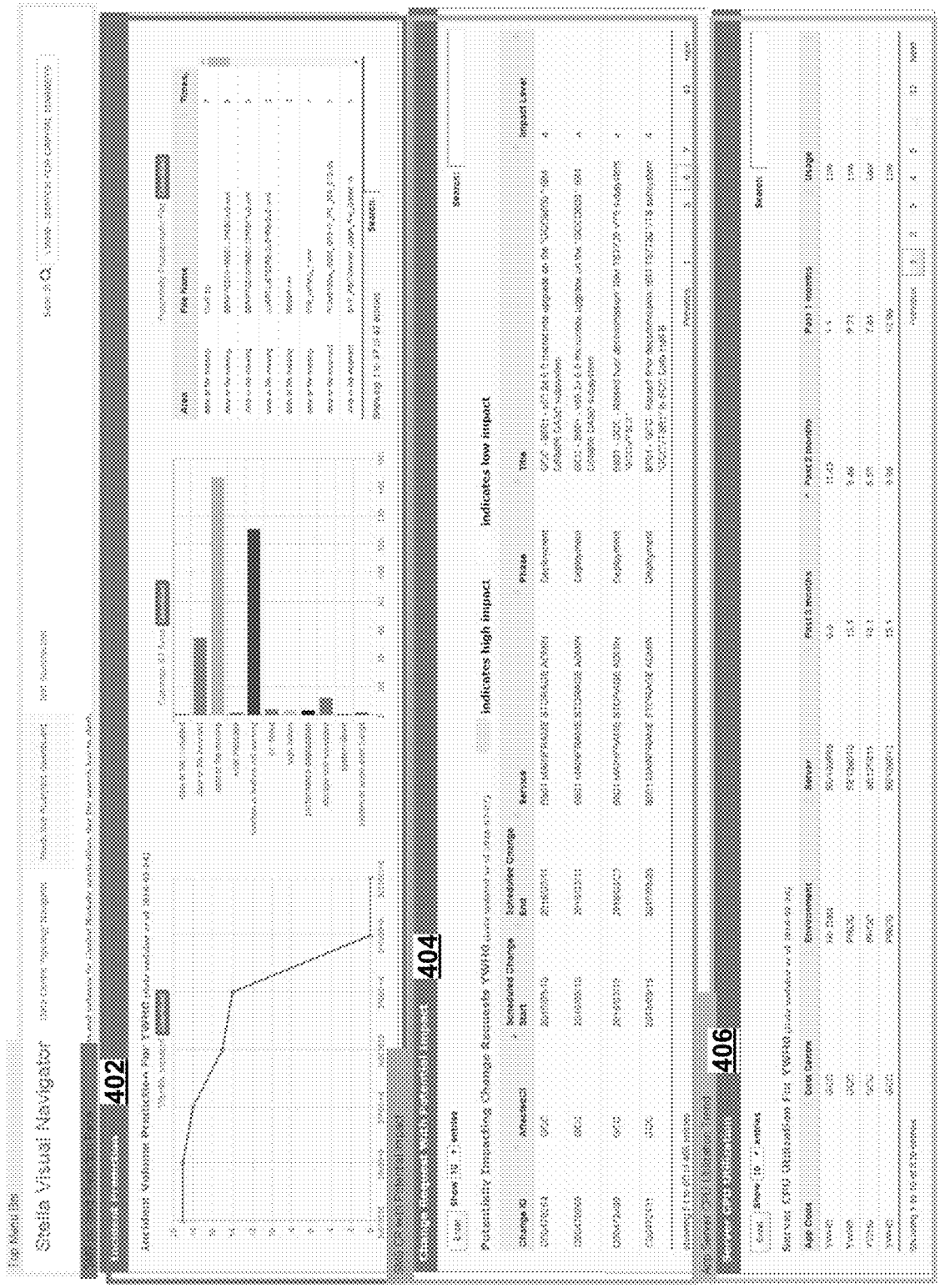
FIG. 4 is an example interface with visual elements for incident prediction, according to some embodiments.

FIG. 4 is an example interface 400 with visual elements for incident prediction according to some embodiments. The visual elements for incident prediction can relate to incident and outage predictions for commercial market (CM) applications, for example. The interface 400 includes a predictive analytics dashboard with a search field to receive an application code or application name.

The interface 400 includes an incident prediction pane 402 with visual elements that correspond to incidents or events detected by platform 100. The incident prediction pane 402 can include a weekly prediction SM9 incident volume per application, for example. The incident prediction pane 402 can include a graph structure representing an incident prediction volume, for example. The incident prediction pane 402 include visual elements for a particular area of a data centre (e.g. common area) and visual elements for potentially problematic files, for example.

The interface 400 includes Change Request Potential Impact panel 406 with visual elements for change requests that can potentially impact a given application environment with a search field to search for specific keywords. The Change Request Potential Impact panel 406 can have visual elements for change identifier, affected application, scheduled change date, service description, phase, title, and impact level for different change requests.

The Change Request Potential Impact panel 406 can a search field to search for specific keywords. The interface 400 includes an Application Server CPU Utilization Trend panel 406 with visual elements for CPU utilization trends of application servers to identify potential cost savings opportunities and a search field to search for specific keywords. The Application Server CPU Utilization Trend panel 406 includes application codes, data centre identifiers, environment identifiers, server identifiers, date ranges for incidents, and usage indicators.

Figure 5:
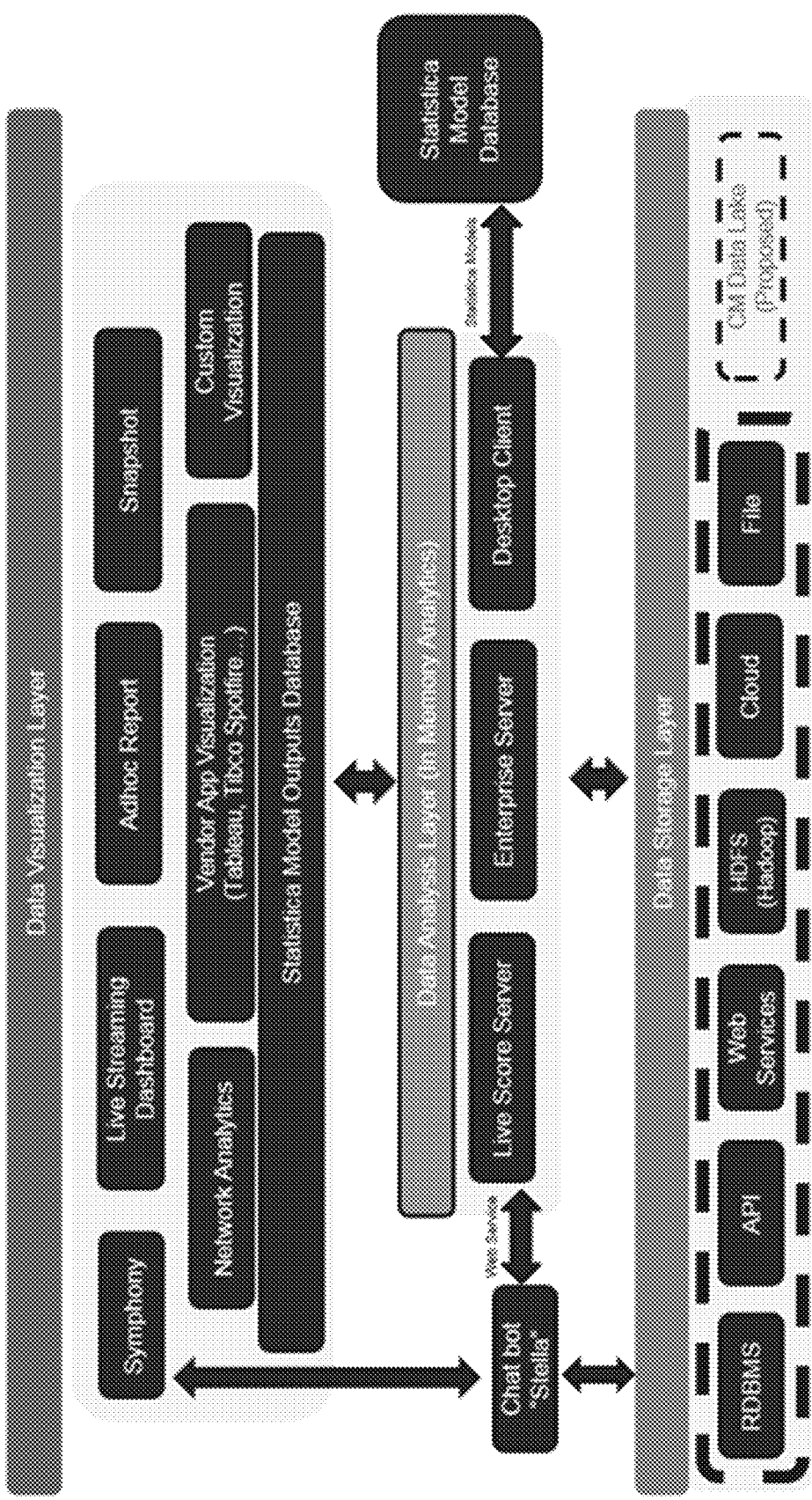
FIG. 5 is an example architecture diagram, according to some embodiments.

FIG. 5 is an example architecture 500 diagram according to some embodiments.

The logical application architecture 500 can be divided into three layers. A first layer can be a data visualization layer where different visualization technologies (e.g. graph generator 125) are used to show the various model outputs to different stakeholders via front-end GUIs at interface application 130. Ranging from live streaming dashboard built and native network analytics and visualization modules, and the chat-rooms of virtual agent 180, the data visualization layer is flexible to be able to give users the kind of information they need.

Another layer can be the data analysis layer with enterprise capability to build and test different use-cases using advanced data analytics methods and tools to provide descriptive, prescriptive, and predictive analysis. The outputs of this layer can be stored in a data storage tracking historical incident ticket titles and descriptions.

Figure 6A:
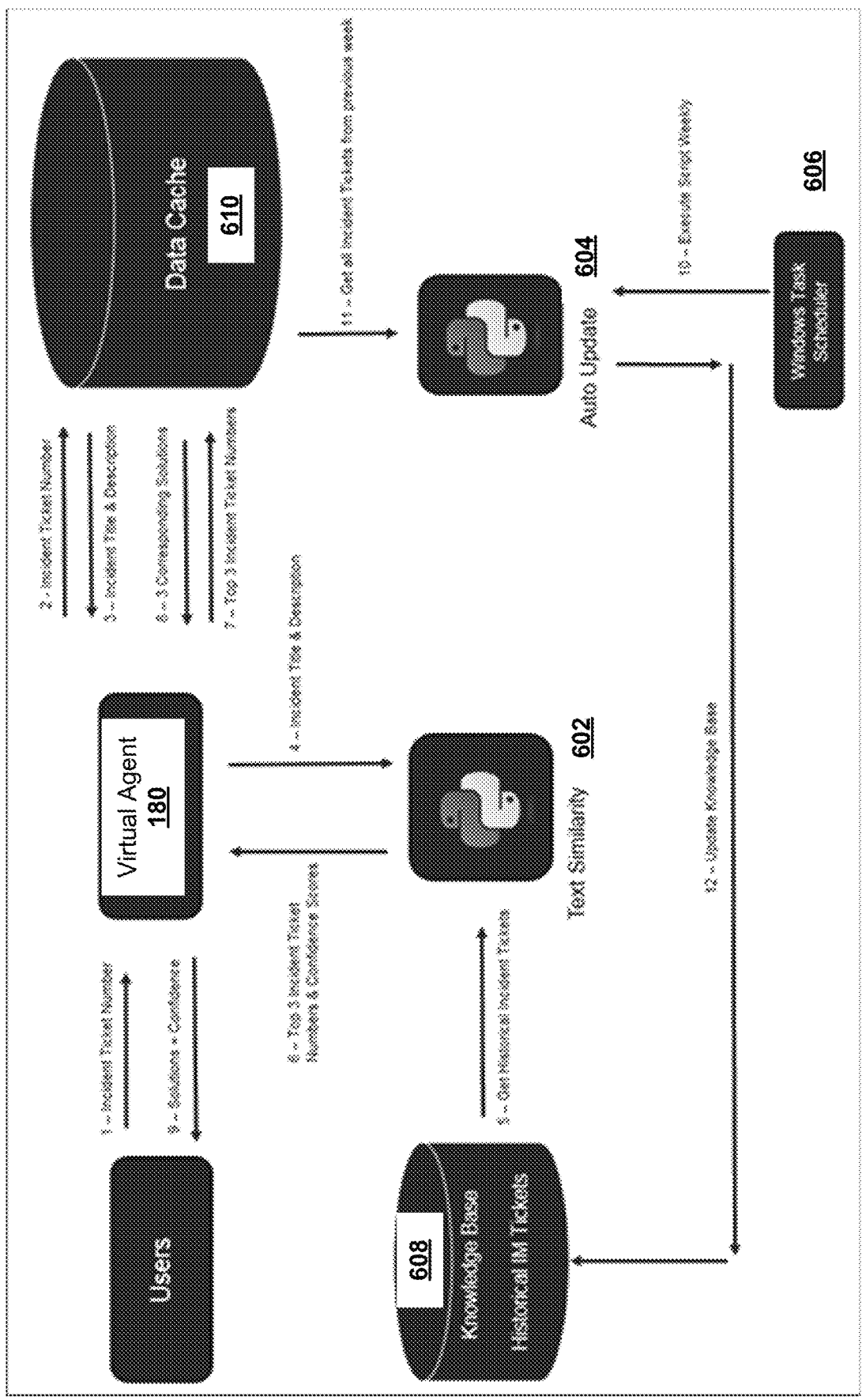
FIG. 6A is a schematic diagram of an example architecture for implementing aspects of natural language processor for incident solution prescription, according to some embodiments.
Figure 6B:
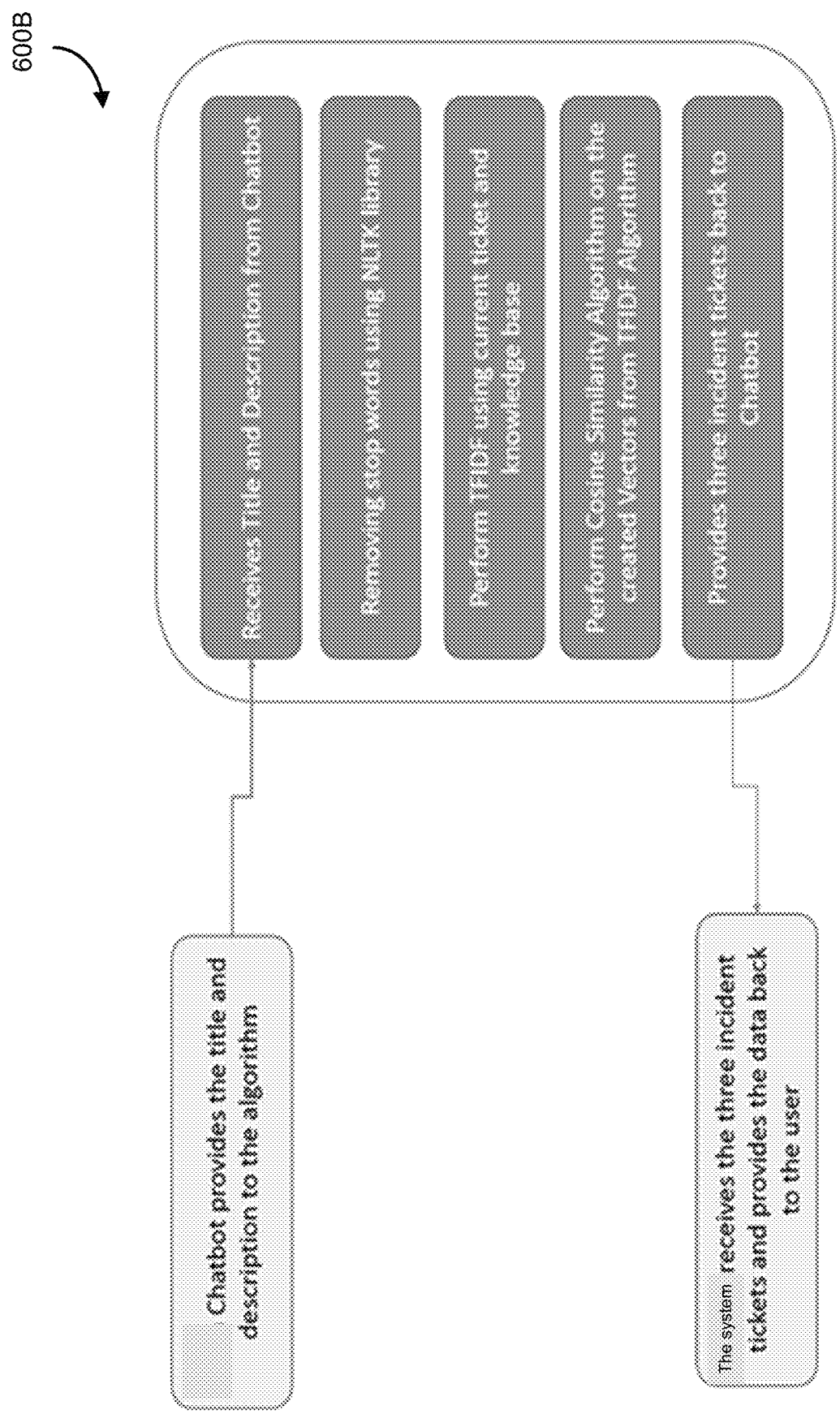
FIG. 6B is a method diagram showing an example method for incident solution prescription, according to some embodiments.
Figure 6C:
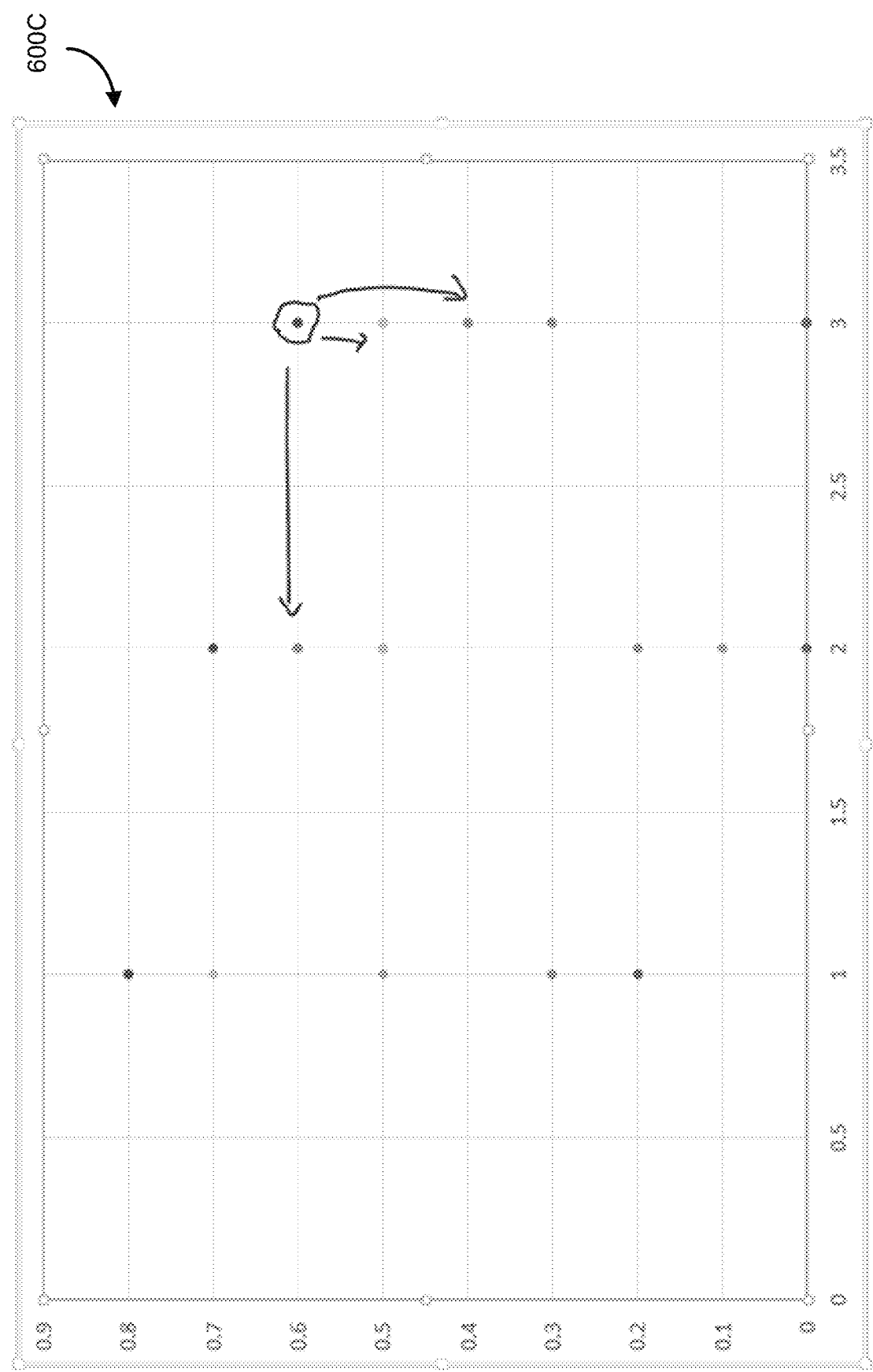
FIG. 6C is a graph showing a constellation of vector representations, according to some embodiments.

FIG. 6A is a schematic diagram of an example architecture for implementing aspects of natural language processor for incident solution prescription, according to some embodiments. FIG. 6B is a method diagram 600B of an example method for incident solution prescription, according to some embodiments. FIG. 6C is a graph 600C showing a constellation of vector representations, according to some embodiments.

The natural language processor 120 can implement automatic expansion of a knowledge base 608 (at data storage 110) to provide a self-learning architecture.

The natural language processor 120 can include instructions or scripts which can include a text similarity process 602 (e.g., Term Frequency and Cosine Similarity) that can involve the following operations: Concatenate Title and Description of new incident ticket; Remove stop words from the title/description; Performs Term Frequency Inverse Document Frequency on Knowledge base 608 (of data storage 110) new Incident with ngram range (1,3); Execute cosine similarity on the new incident title/description against all historical incidents; Sort the output of cosine similarity based on closet matching incident tickets; Determine top 3 (or more) indexes and map them back to their respective incident numbers; Output the incident numbers and confidence scores.

This can be implemented using a prescriptive process developed in a coding language such as python, for example. The reference to "ngram ranges" can relate to the library sklearn (machine learning library) and a parameter that can be enabled inside the tokenization function.

The reference to cosine similarity can relate to a function of the sklearn library. This function calculates the similarity/distance between incident tickets. Once the distance/similarity is calculated, the natural language processor 120 can transform this FIG. into a percentage and provide it to users (e.g. via virtual agent 180) as a type of confidence score. The platform 100 and natural language processor 120 can apply the prescriptive process to the domain of incident ticket management/ticket prescriptions and provide users with a confidence score based on similarity via the virtual agent 180.

In some embodiments, the platform 100 uses historical incident data to predict incident ticket volumes, ticket types. The platform 100 can also process timing data regarding when an incident was reported using a ticket (report or detection time) and when the incident occurs (incident time) to compute incident lag variables. There can be a lag between when a problem occurs and when incident tickets are submitted. For example, one resource may crash, incidents may not occur until later in day when users use an application requiring that resource.

As another example, one of two resources may crash, incidents may not occur until second resource becomes overloaded. The platform 100 can use prediction models 126 to learn and predict lag times. The results may allow for better scheduling of resources (IT personnel, servers/computing resources), or proactive responses to incidents which are indicative of larger problems or incidents which can manifest in larger problems if not addressed. The virtual agent 180 can also be used to submit incidents.

The natural language processor 120 can include instructions or scripts which can include an Auto-Update Process 604 that can involve the following operations.

Task scheduler 606 can be used to execute the script on according to a date/time parameter (e.g. off peak hours). The script can be stored in a data cache (of data storage 110) and acquires all incidents (title and descriptions) from the past week or other period. The auto-update process 604 can concatenate title and description of new incident tickets, and remove stop words (e.g., low value words) from all titles/descriptions, and update the knowledge base 608 with new incident tickets.

Different program libraries can be used to create the instructions for the processes such as: codecs, sklearn, nltk, numpy, operation, and sys, for example.

A sample input could be: "how do I fix inc0304036". The platform 100 may review a corpus of incidents, and revert the output data structure:

Incident[1]: imDescription=RPT012-01005—Critical System Exception—Exception encountered when navigating to exposure management page; imTitle=BL10-RPT012 process failed; imSolution: Issue:RPT012 process failed Resolution: process is restarted and it in running state. Cause: Exception encountered when navigating to exposure management page.

Incident[2]: imDescription=RPT012-01005—Critical System Exception—Exception encountered when navigating to exposure management page VDI: ZJ84943Z; imTitle=BL10 RPT012 critical exception encountered! imSolution: Resolved by restarting the process.

Incident[3]: imDescription=RPT012-01005—Critical System Exception—Exception encountered when navigating to exposure management page; imTitle=BL10-RPT012 Critical System Exception; imSolution: RPT012 process was rerun and completed unsuccessfully.

In this example, in an embodiment, the output data structure could be used to automatically invoke or initiate a data process for causing a process restart (e.g., the running of a shell script to stop and restart the process).

In some embodiments, a visual characteristic of the first textual graphical element, the second textual graphical element, or the third textual graphical element corresponding to each potential solution is modified based on the cosine similarity score corresponding to the potential solution.

The visual characteristic is selected from a group consisting of: font size, font color, background color, and opacity level. For example, visual characteristics can be modified to emphasize or otherwise distinguish between potential solutions to represent differences in cosine similarity scores or confidence scores.

Figure 7A:
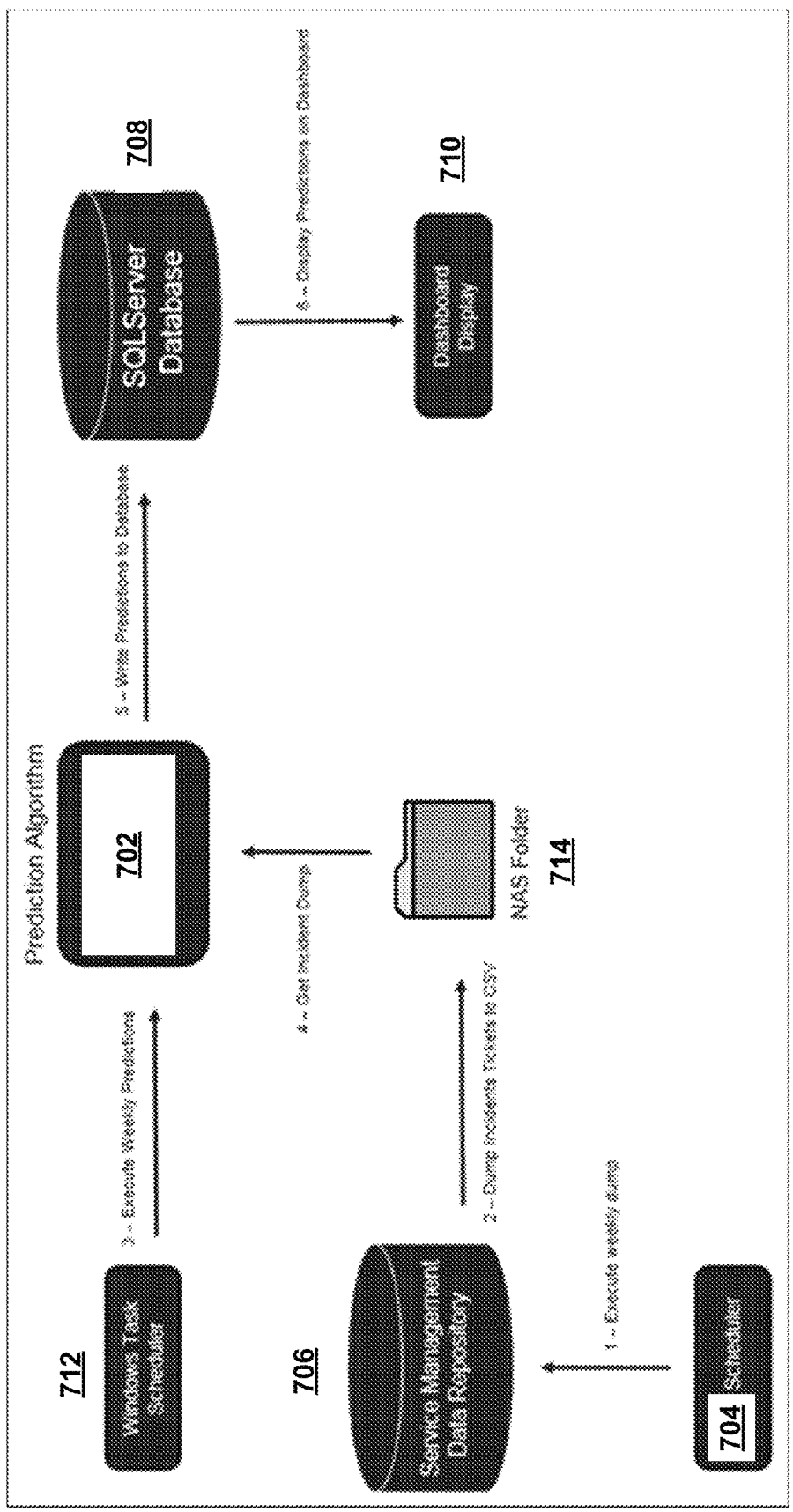
FIG. 7A is a schematic diagram of an example architecture for implementing aspects of natural language processor for incident solution prediction, according to some embodiments.
Figure 7B:
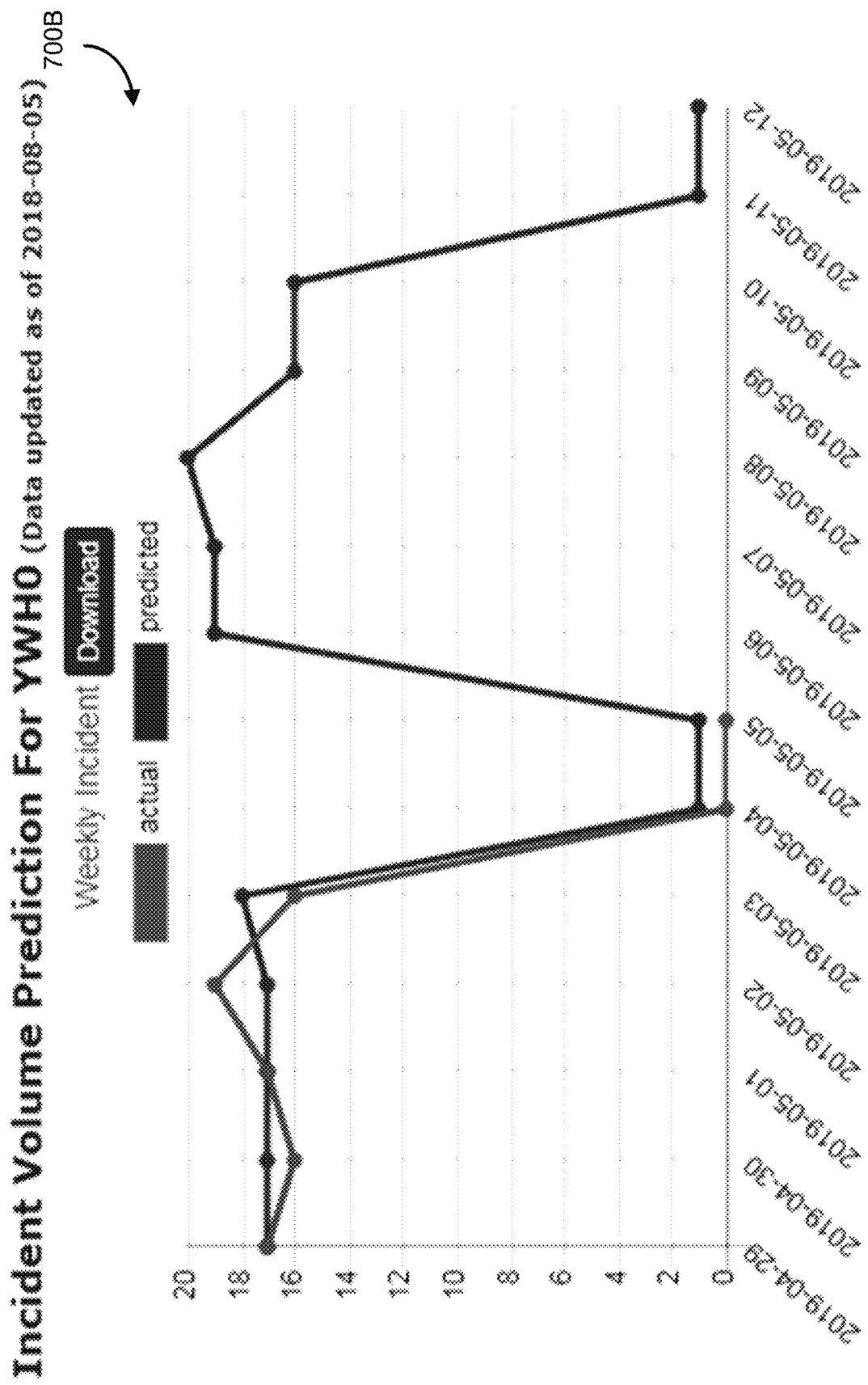
FIG. 7B is an example output graphic, according to some embodiments.

FIG. 7A is a schematic diagram of an example architecture 700 for implementing aspects of natural language processor 120 for incident solution prediction according to some embodiments. This example relates to an IT incident prediction use case. The platform 100 can natural language processor 120 can provide an IT incident ticket solution using predictive analytics. FIG. 7B is an example output graphic 700B, according to some embodiments.

IT support teams might not be able to anticipate the volume of IT incident tickets, making it difficult for business users to meet their business objectives or to manage operational risk; further it becomes challenging for support managers to plan their resources properly. This becomes problematic when planning support personnel and infrastructure capacity around different international holidays for a global bank.

The platform 100 can uses Time Series Analysis to predict a volume of IT incidents for a given application based on historical IT incident ticket data. This can enable preemptive outage prevention and early problem detection enables faster mean repair time and eventually reduced number of IT incidents raised. Further, predictive models 126 can be used to predict operational risk events that could mean impact from a financial, reputational, operational or regulatory perspective. The predictive models 126 can detect user access anomalies or intrusion detection are also being built.

The platform 100 can implement an Incident Ticket Volume Prediction process using predictive models 126. The Prediction Process 702 can include instructions to implement the following operations: receive data from service management repository 706 for all incident tickets from the past week or other time period at a folder 714 with transfer trigger by schedule 704; task schedule 712 execute prediction call; Subset incident tickets by App Code; Aggregate the number of incident tickets by date; Remove outliers from data set (e.g., those greater than 2 times the standard deviation); Join incident dataset with calendar information on date; Add zeros where data is null; Feature engineer new incident lag variables(e.g., 14 variables [number of incidents on previous days]; Passes the data into a trained Neural Network Regression model (e.g., python random forest regression model with hyper_parameters of max_depth=5, bootstrap=True, max_features=auto, max_leaf_nodes=None, min_samples_leaf=1, min_samples_splot=2, min_weight_fraction_leaf=0.0, n_jobs=1, oob_score=False, random_stat=0, verbose=true, warm_start=False; Round Predictions to nearest integer; Write predictions per App Code to database 708; display output at dashboard display 710 (e.g. interface application 130).

Example python libraries for implementation include: Pandas, numpy, datetime, sklearn, pyodbc.

Figure 8A:
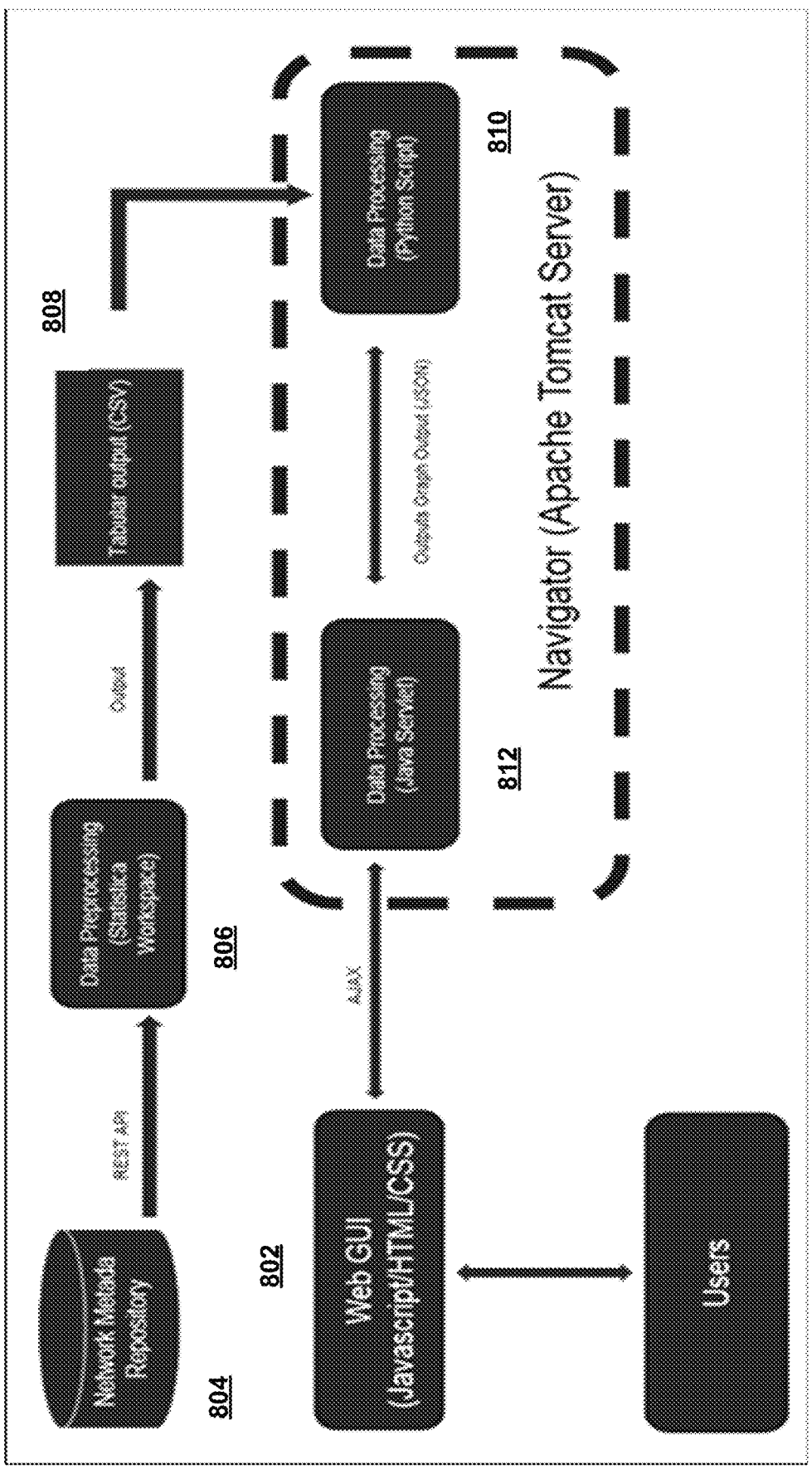
FIG. 8A is a schematic diagram of an example architecture for implementing aspects of graph generator to generate visual elements, according to some embodiments.

FIG. 8A is a schematic diagram of an example architecture 800 for implementing aspects of graph generator 125 to generate visual elements corresponding to the infrastructure (or data centre) topology using descriptive analytics, according to some embodiments.

Figure 8B:
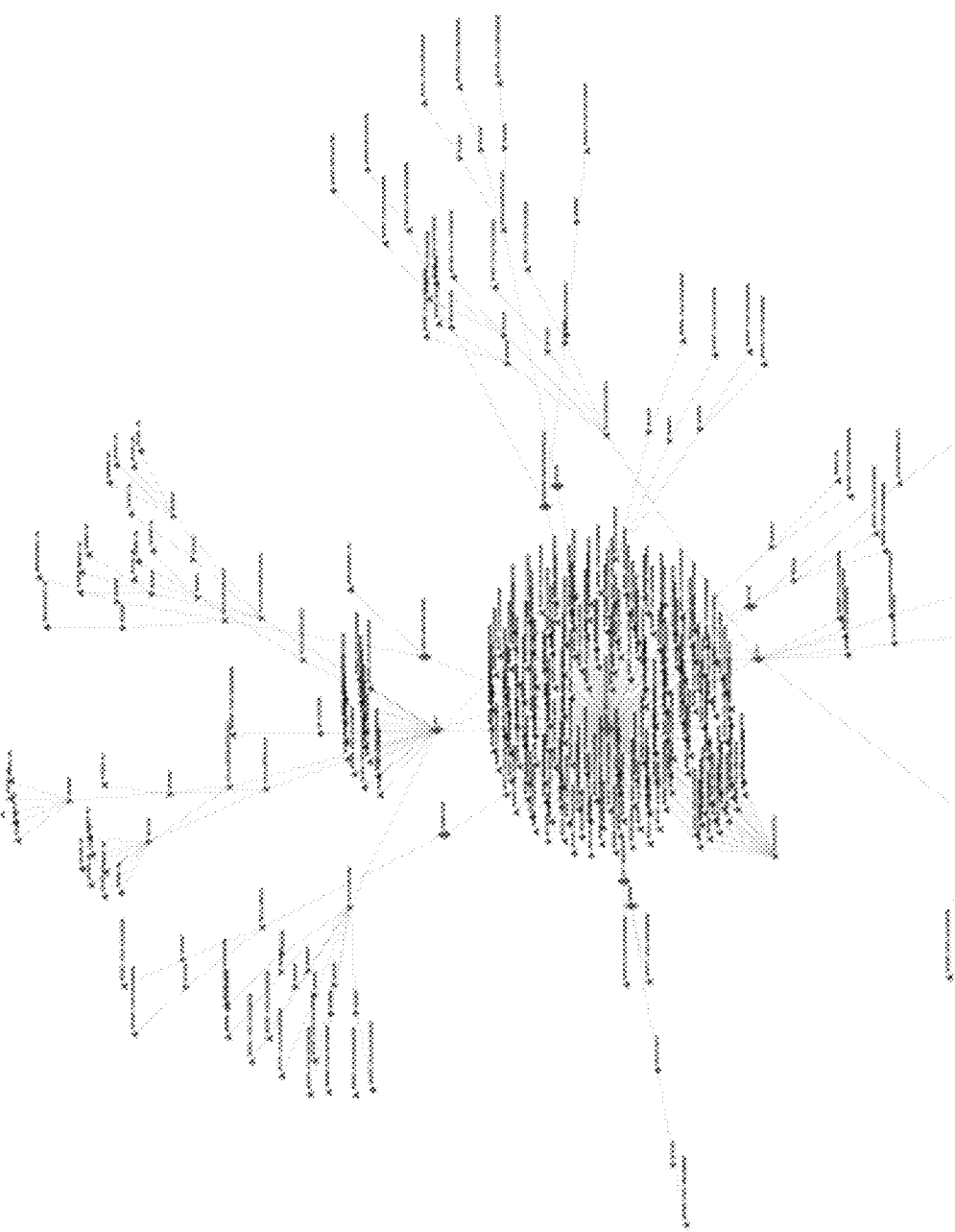
FIG. 8B is an example network graph illustration, according to some embodiments.

FIG. 8B is an example network graph illustration, according to some embodiments.

Consolidating different network infrastructure data sources to get an understanding of its IT landscape can be a large IT greenfield project. The relationships between network components might not be explicit in the raw data sources and also important data fields can be missing depending on the data source. Additionally, connecting infrastructure data with IT security and risk data can also be difficult. The platform 100 can address security and risk issues more proactively.

The platform 100 uses graph generator 125 and network theory to process data received from different internal infrastructure data sources 160 to generate an interface with a visualization of data center or infrastructure topology for a given application. Both IT and business users can benefit from the visual understanding of their IT infrastructure to have valuable conversations around IT infrastructure planning, security and risk assessments.

The platform 100 can use data processing and scripts or instructions to generate a visualization of which users can interact with using interface application 130 or web browsers. The following is a logical workflow of the process that can be implemented by graph generator 125: Extract network metadata through API from network metadata repository 804 (that can be collected from different network entities 150); Preprocess raw network metadata and convert from JSON to a tabular CSV file 808; when a user interacts with the interface application 130 or web page, the following operations can happen sequentially: the web page script module starts a AJAX request with the Navigator, In the Navigator, the Java Servlet runs the Python script 810 to consume the tabular CSV file, the Python script 810 analyzes the data and builds the application topology graph as an edge set and a vertex set, the Java Servlet 812 returns the AJAX request initiated by the earlier operation to the web page 802 JavaScript module, and the JavaScript module uses D3/SVG technologies to render the topology graph as a set of interactive 3D visual elements on the web page.

The following example technologies can used to develop the AI-driven network topology graph: JavaScript(D3.js, jQuery); CSS(Bootstrap); Java; Python (networkx); Apache Tomcat.

The details of how a 3D network topology graph is generated is described in the following non-limiting example method:

Input data is a table that each column is a type of infrastructure item (server, virtual host, cluster . . . ). The sequence of the columns is established and strictly follows the order of connectivity sequence between infrastructure items.

The category "server" is the first column in the table. For example, in reality, a server runs on a virtual host which runs on a cluster and the cluster runs in a data center. Therefore, the column sequence has to be from left to right, server=>virtual host=>cluster=>data center A Python mechanism creates an undirected graph object using networkx library. Then the mechanism treats each item in the table as a node in the graph object, and creates an edge between each two adjacent items on the same row in the input table.

If on a row, some of the column items are not available (null value) due to lack of information, such as a virtual host and cluster name of a server is missing, the mechanism iterates through the whole row so that it creates an edge between the server and the first item on the row that is not null. By doing this, the mechanism avoids creating meaningless edges that connect meaningless null nodes.

The mechanism returns the graph object as a node set and an edge set in JSON format. All the attributes associated with the infrastructure items such as server compliance, server ping status is also stored within each node. A node in the node set is a Python dictionary where the attribute categories are the keys and the attribute values are the values.

The front end Javascript mechanism consumes the JSON string which contains the graph object from step 4 above and renders the graph using D3.js Javascript library as the network topology graph.

Figure 9:
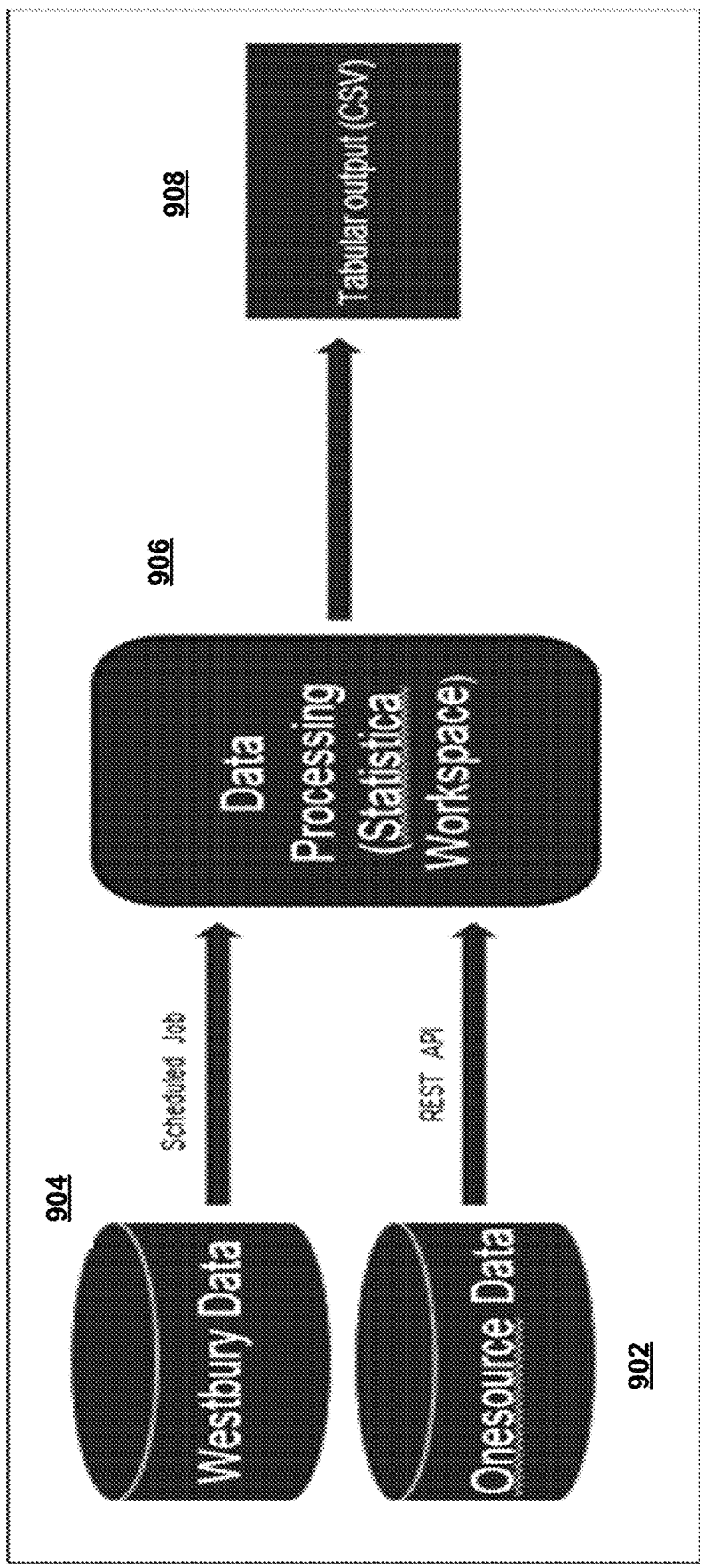
FIG. 9 is a schematic diagram of an example architecture for implementing aspects of natural language processor for change record impact prediction, according to some embodiments.

FIG. 9 is a schematic diagram of an example architecture 900 for implementing aspects of natural language processor 120 for change record impact prediction according to some embodiments.

A Change Record/Request (CR) is used to document changes made to an application or service. A change made to one application may cause issues to that application directly or other related application(s) indirectly.

An example challenge around IT Change Management is a lack of proper tagging of all affected configuration items a change is impacting, whether directly or indirectly. Making connections between different applications and infrastructure pieces can make sense from change management perspective in evaluating the risk of a change as well as predicting potentially affected applications that the change requester may have missed.

An additional source, in some embodiments, can include MyOps data showing infrastructure inventory data (e.g., server, virtual host, cluster, switch, router, or data center information).

The Natural Language Processor 120 can process the change records and link the processed tokens with the application topology network generated from infrastructure inventory data (by graph generator 125). By doing that, a change of application A can be linked to application B if the description of the change mentions an item connected to application B.

Natural Language Processor can implement a Change Record Impact Prediction process. The Prediction process can implement the following logic: Retrieve change record data from Change Management BI reporting database 904 (e.g. at data storage 110); Retrieve application infrastructure data from infrastructure inventory 902; Using text mining data (e.g., Python NTLK Library) processing 906 to get meaningful tokens from change records and link them to an application infrastructure table 908 generated from infrastructure inventory data; If an application is found to have an infrastructure item related to the change record, output that application and the actual item that is impacted by the change record.

Technologies for implementation can include Python, a Statistica workspace, and the NLTK library.

Figure 10:
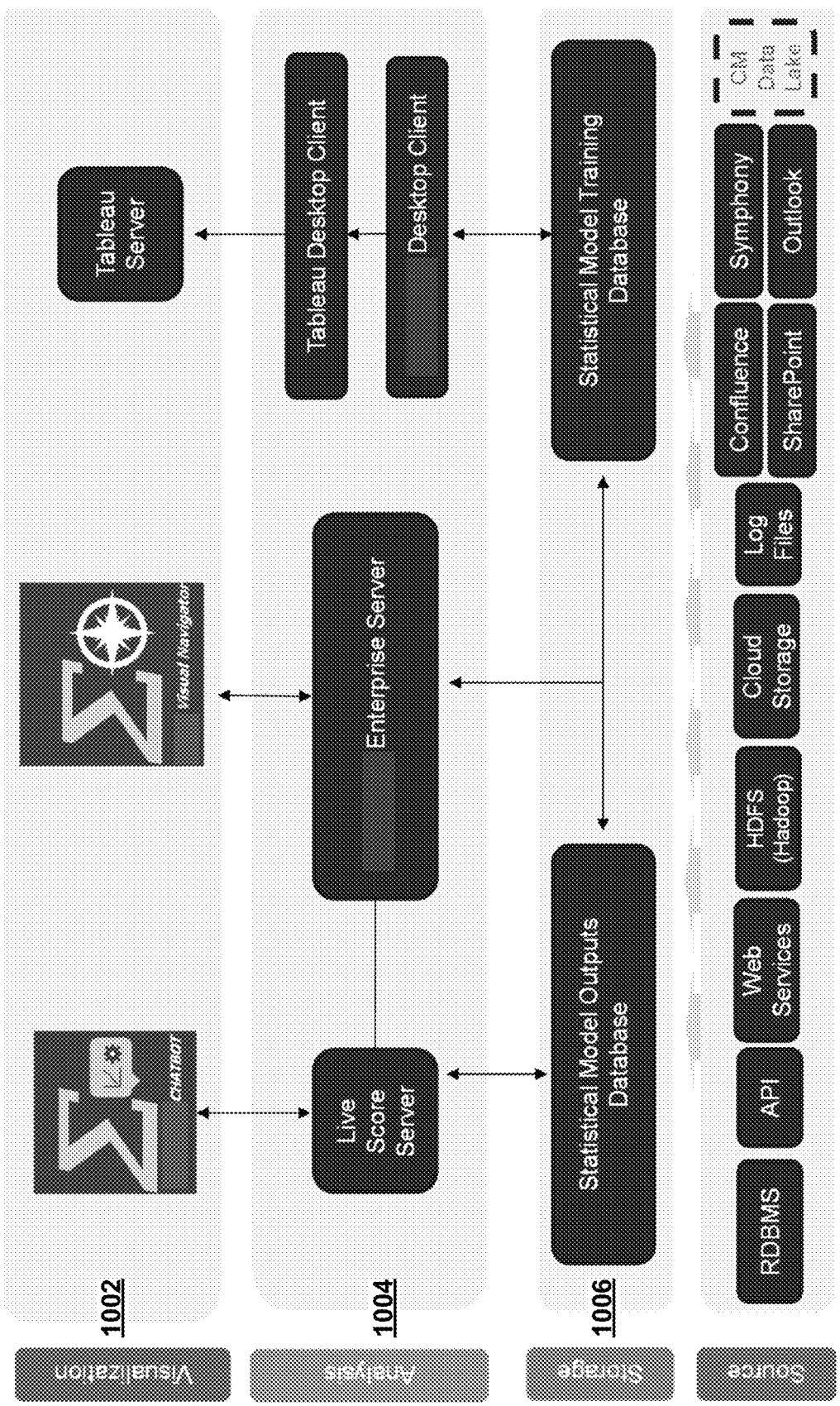
FIG. 10 is a schematic diagram for data visualization, analysis and storage architecture, according to some embodiments.

FIG. 10 is a schematic diagram for data visualization, analysis and storage architecture 1000 that can implement aspects of platform 100.

The architecture 1000 can be divided into different layers. An example layer is Data Visualization 1002 that generate a front-end visualization to display the findings based on the statistical model outputs. Another example layer is Data Analysis 1004 for building and testing of descriptive, predictive, and prescriptive statistical models. A further example layer is Data Storage 1004 with In-place Database Processing (IDP) to read only the required data from various data sources.

The platform 100 can implement different use cases with examples described in relation to different use case design diagrams to show the logical process of each use cases.

The platform 100 can have a visual Navigator implemented at interface application 132 focus on the production and visualization of support analytics to help users with understanding application specific IT landscapes. The visual elements can represent data centre components and associated metadata specific to applications. The platform can implement an application weather report as a prediction base dashboard application 130 that can display production service management and server metrics. The displayed data can indicate ticket volume forecasts, incident root cause category classifiers, change induced IT incident prediction metrics, application server anomaly detection metrics, server metadata summary, and so on.

The platform 100 can implement a virtual agent 180 which can be an automated chat bot agent with a focus on providing IT production support based on predictive models 126, natural language processor 120 and machine learning.

Figure 11:
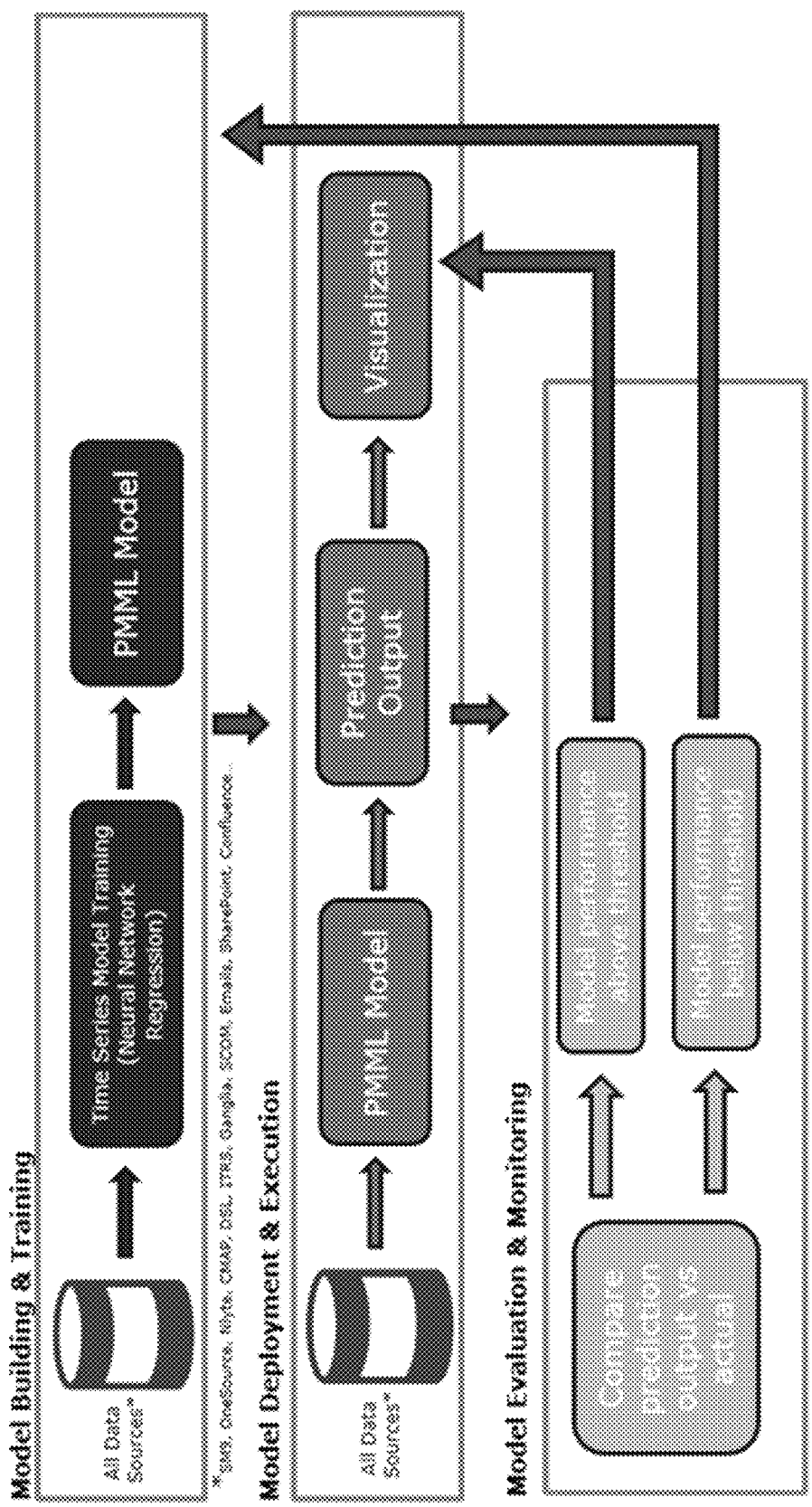
FIG. 11 is a schematic diagram of an architecture for predictive analytics for time series analysis, according to some embodiments.

FIG. 11 is a schematic diagram of an architecture 1100 for predictive analytics for time series analysis that may be implemented by aspects of platform 100.

The platform 100 can generate a Volume of Incidents Prediction. The platform 100 can use Time Series Analysis of historical SM9 incident tickets to predict and forecast volume of incidents for proactive application support planning and infrastructure capacity planning. The platform 100 can enable proactive outage prevention and early problem detection to enable faster mean repair time and to prevent business impact.

Figure 12:
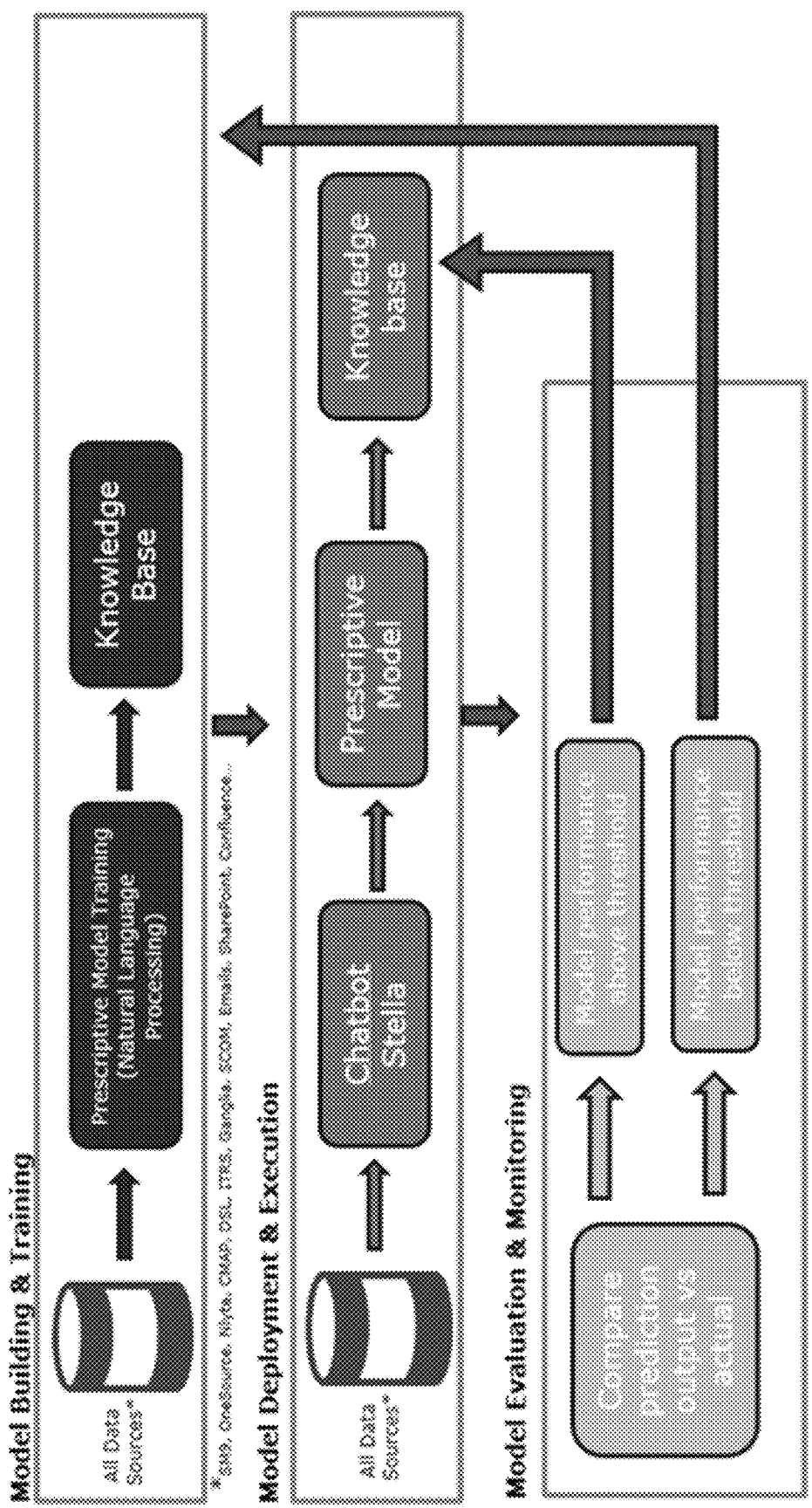
FIG. 12 is a schematic diagram of an architecture for prescriptive analytics using natural language processor, according to some embodiments.

FIG. 12 is a schematic diagram of an architecture 1200 for prescriptive analytics using natural language processor 120 according to some embodiments.

The platform 100 can use Natural Language Processor 120 for analyzing the historical knowledge base that can reside in multiple data sources 160 to supply the IT support staffs on how to respond to IT incidents, and allow optimization of IT resources. The platform 100 can leverage text mining from SM9 incident ticket titles and descriptions to learn from past solutions and predict root cause of future issues and incidents; reduce triage time and speed up resolution time to minimize business impact. The platform 100 can build models 124, 126 to answer questions for solutions to problems/incidents posed in natural language via virtual agent 180. The platform 100 can enable continuous expansion of knowledge base for L1/L2 support analysts to reduce triage and resolution cycle time. The platform 100 can receive input from virtual agent 180 for Natural Language Processor 120 from L2 analysts for example. The platform 100 can integrate with an enterprise chat room as front-end display of model outputs and enable automatic initiation of Chat Rooms when required. The platform 100 can enable automatic initiation of P1/P2 incidents for Chat Rooms, based on prediction of incident severity using prediction model 126, for example.

Figure 13:
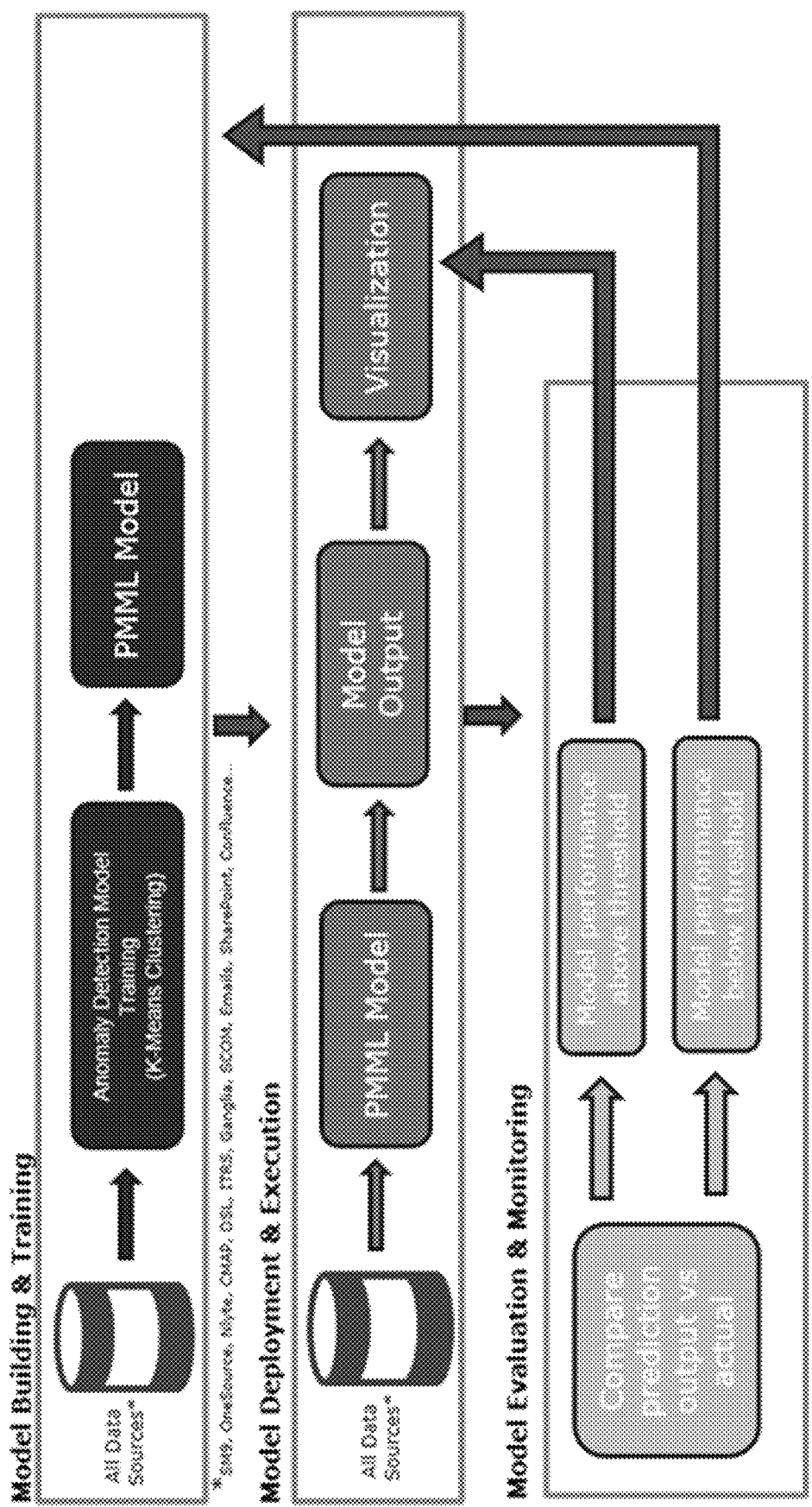
FIG. 13 is a schematic diagram of an architecture for anomaly detection using event detection, according to some embodiments.

FIG. 13 is a schematic diagram of an architecture 1300 for anomaly detection using event detection 122 according to some embodiments.

The platform 100 can use event detection 122 to detect anomaly behaviours of servers which could be the early signs of server degradation and outage. The platform 100 can predict outages/degradation of infrastructure and correct calibration of alerts using prediction models 126.

For example, the platform 100 can use event detection 122 to detect anomaly behaviours using a model to determine whether an employee contains any accesses that are abnormal based on the accesses that other individuals on their team have. For each employee a Jaccard Index can be computed between themselves and every other employee in the team. Then for each employee an average Jaccard index is calculated and used to classify their accesses as either normal, warning or abnormal. In other examples, this model can be used to generate alerts for intrusion detection on any device.

Figure 14:
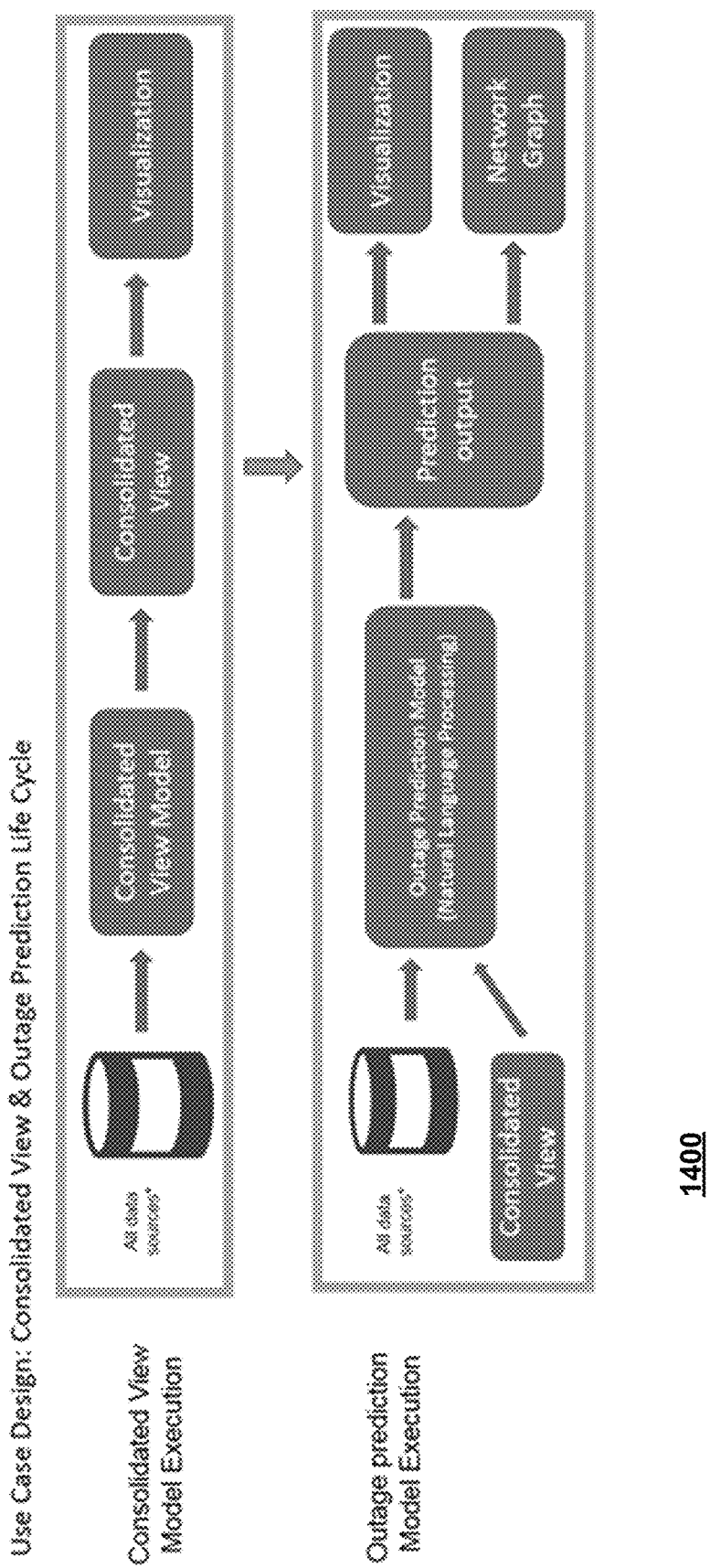
FIG. 14 is a schematic diagram of an architecture for a consolidated view and outage prediction, according to some embodiments.

FIG. 14 is a schematic diagram of an architecture 1400 for a consolidated view and outage prediction according to some embodiments. The platform 100 can enable failure detection and prediction. The platform 100 can use network analytics to generate visualization of the key relationships between infrastructure components, source systems, application components, and business processes. Identify bottlenecks or hotspots in process. The platform 100 can understand downstream impact of outages, unexpected events, or other changes based on upstream incidents or changes.

Figure 15:
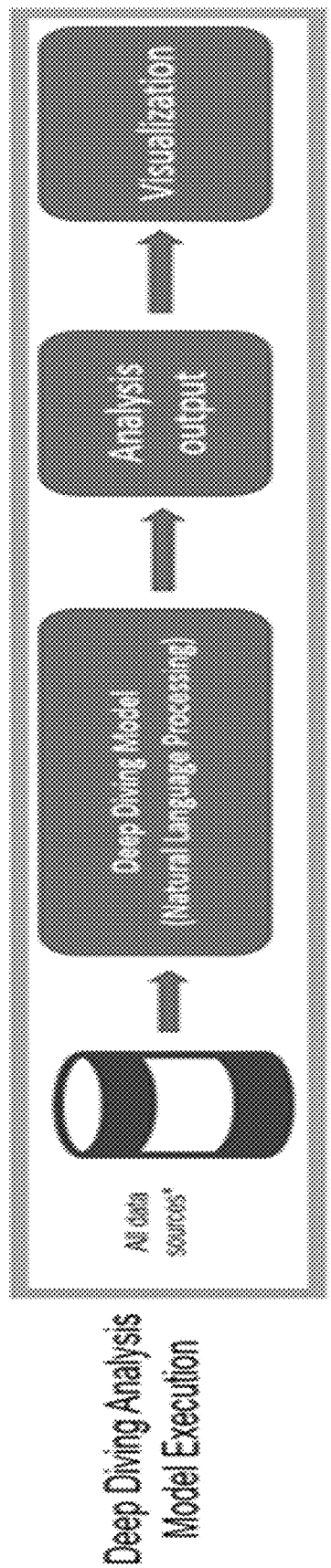
FIG. 15 is a schematic diagram of an architecture for deep diving analysis, according to some embodiments.

FIG. 15 is a schematic diagram of an architecture 1500 for deep diving analysis according to some embodiments.

The platform 100 can leverage text mining from SM9 incident ticket titles and descriptions to learn from past solutions. The platform 100 can find the root cause of the repetitive issues. The platform 100 can predict root cause of future issues and incidents based on the root cause analysis.

Figure 16:
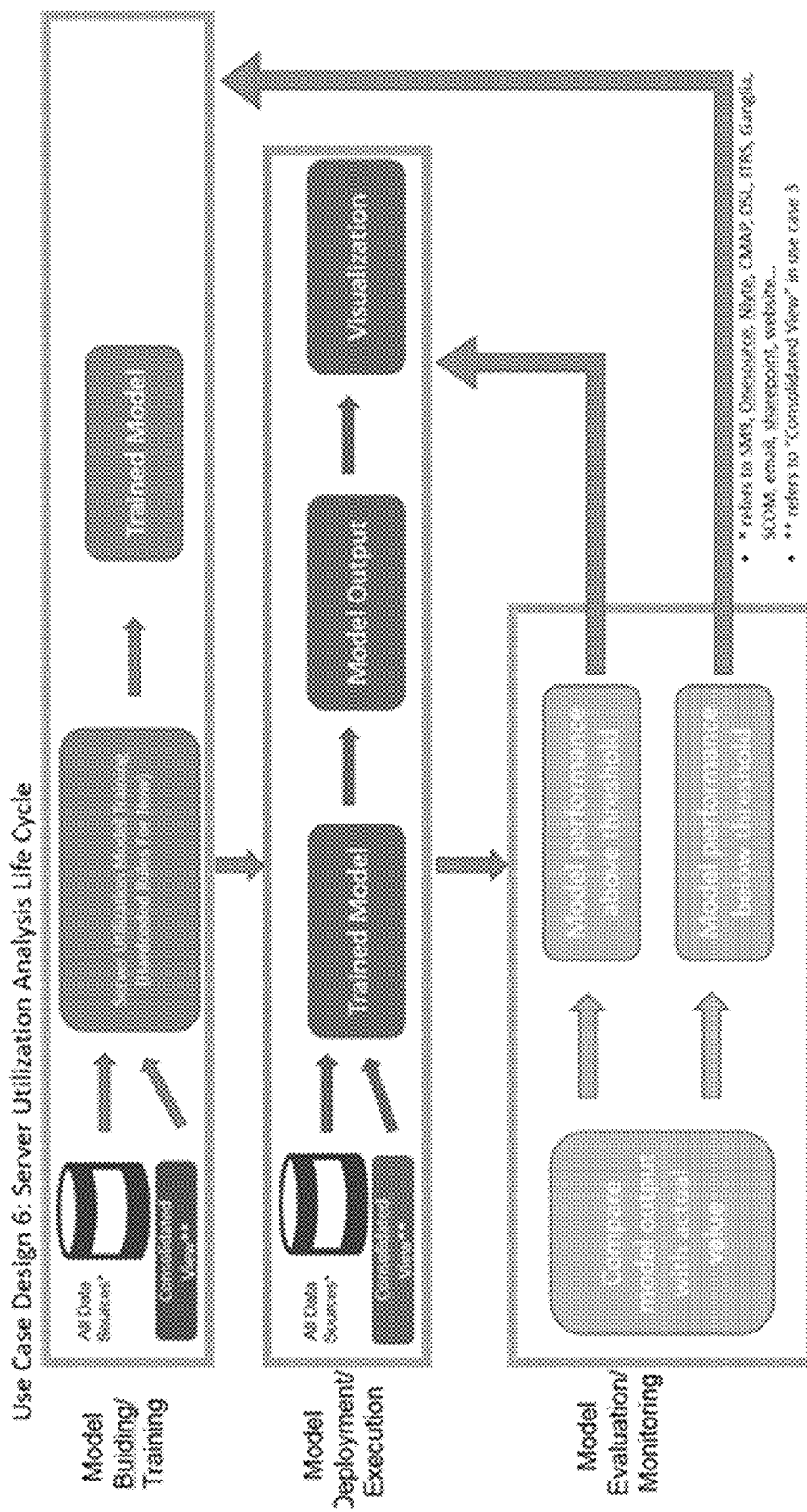
FIG. 16 is a schematic diagram of an architecture for server utilization analysis, according to some embodiments.

FIG. 16 is a schematic diagram of an architecture 1600 for server utilization analysis according to some embodiments.

The platform 100 can detect active servers which are underutilized or not used at all. The platform 100 can enable component management.

Figure 17:
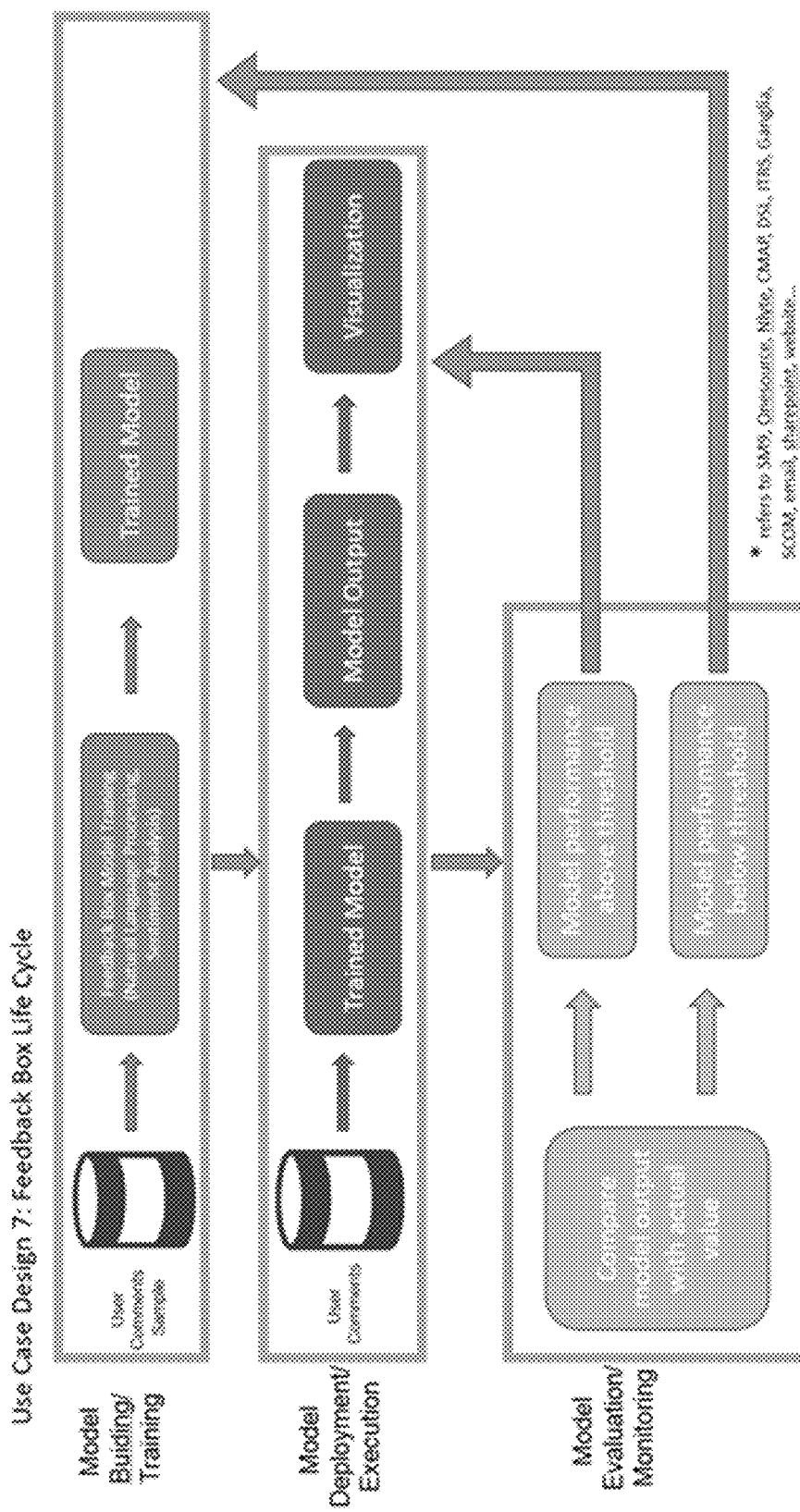
FIG. 17 is a schematic diagram of an architecture for feedback box data analysis, according to some embodiments.

FIG. 17 is a schematic diagram of an architecture 1700 for feedback box data analysis according to some embodiments.

The platform 100 can predict the sentiment behind user comments submitted via "Feedback Box" form or field (e.g. at interface application 130 or virtual agent 180), which helps to filter out the inappropriate/hate comments for compliance. The platform 100 can extract the underlying key topics behind user comments submitted via "Feedback Box" application (e.g. interface application 130 or virtual agent 180), helping the reviewer of the feedback comments to quickly grasp the key topics out of huge amount of data.

Figure 18:
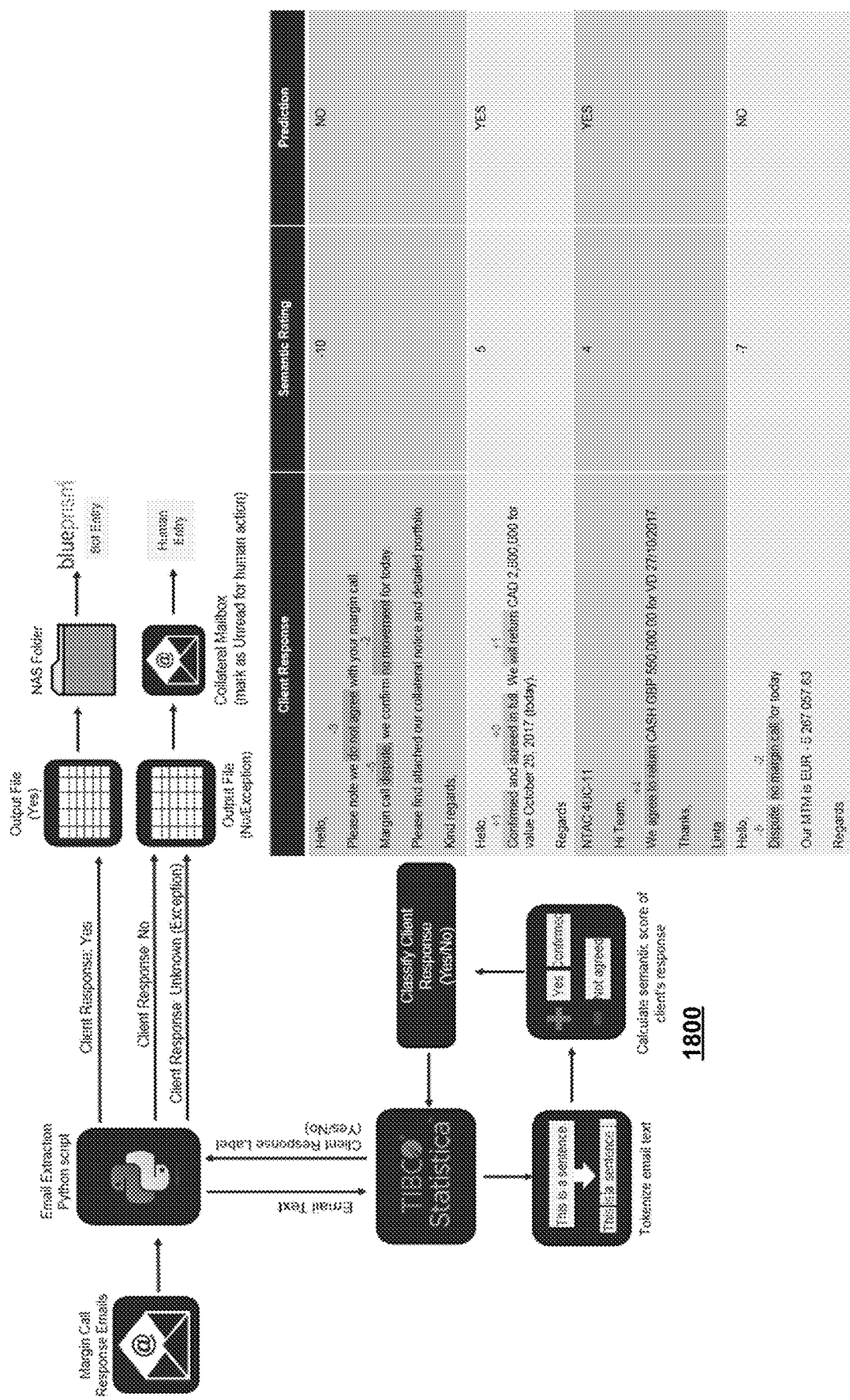
FIG. 18 is a schematic diagram for margin call response classification, according to some embodiments.

FIG. 18 is a schematic diagram 1800 for margin call response classification.

A virtual agent 180 can implement intelligent process automation to replace manual clicks (RPA), interpret text communications (using machine learning and natural language processor 120), make rule based decisions that do not have to be preprogrammed, offer suggestions, and provide real time tracking of handoffs between systems and people. The platform 100 can generate a semantic score for processed text data. For example, the semantic score can be computed by tokenizing text and scoring the tokenized text using positive and negative dictionaries. The text is classified by aggregating the scores to generate the overall semantic score.

The example relates to a Margin Call Counterparty Response Classification process. The platform 100 can generate a semantic score for processed text data. The virtual agent 180 can implement margin call functionality using different components. An example component can involve the classification of the response as either a Yes or No by virtual agent and natural language processor 120. This component can be implement using a custom build dictionary that assigns a sentiment score to each word/phrase and based on the aggregated sentiment score, and classifies the response as either a Yes or No. Another example component is the extraction of the notional amount, currency type, client name, and the value date for populating a data structure for a margin call instance. This can be implement using a code language (e.g. python) customized with regular expressions. This component can translate various date and dollar amounts into a standardized format.

The platform 100 can involve building models 126 for predicting incidents and outages; prescribing solutions for the incidents and outages; detecting relationship of data elements; predicting operational risk events; predicting business impact and integrating this with the virtual agent 108 for user communication.

Figure 19:
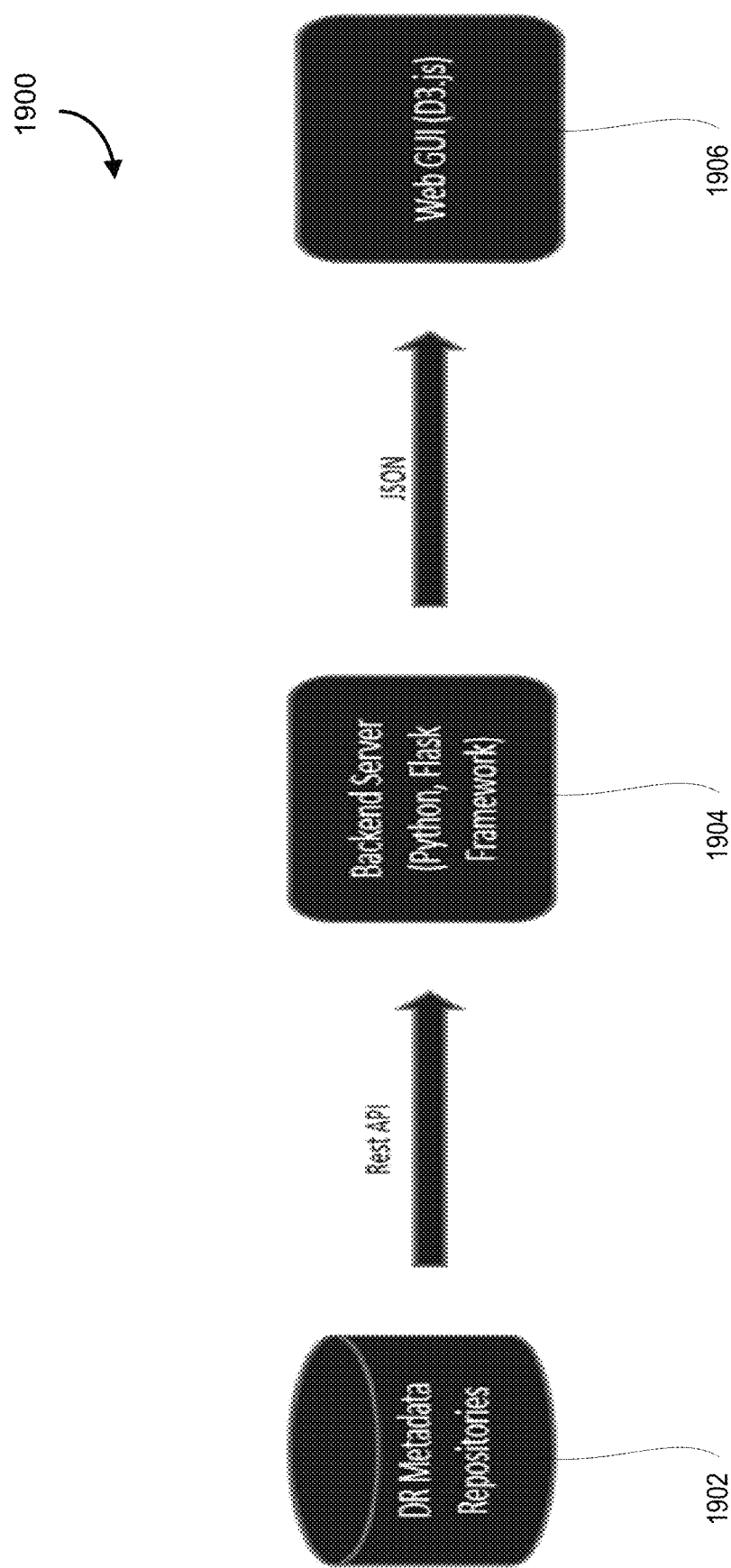
FIG. 19 is a schematic diagram showing a platform for disaster recover planning, according to some embodiments.

FIG. 19 is a schematic diagram 1900 showing a platform for disaster recover planning, according to some embodiments.

In an event of a disaster recovery (DR) exercise or an actual DR event, the understanding between dependencies/interfaces of applications to applications is vital to the correctness and efficiency of the recovery.

The applications in an enterprise are usually interdependent on each other to function correctly, therefore to be able to quickly grasp what are the other applications needed to recover the app in question is very helpful. However, the dependency information is usually stored in tabular format and scattered around all data repositories so it is very hard to quickly grasp the whole picture.

Other information such as application recovery time capabilities and geographic locations of the infrastructure items are also vital to the recovery process, but such information is also usually scattered around in different data repositories and no data analysis is done from a DR perspective.

The platform 100 uses the network theory and a series of processes to analyze through many internal infrastructure data sources to generate a visualization of the infrastructure topology from a DR perspective. Both IT and Business users benefit from the visual understanding of the DR aspects of an application.

The DR planning viewer is a web application that consists of a backend server 1904 and a frontend GUI component 1906. The following is the logical workflow:

The backend server 1904 consumes DR data from various data APIs and generates a JSON object as output, which contains the dependencies of an application as well as other application attributes such as recovery time capability, servers, databases, data centers, among others.

The frontend web GUI 1906 consumes the JSON object from step 1 and renders a 3-D network graph based on the JSON object using D3.js. The graph is a multi-edge directed graph which shows the dependencies between applications as well as connections between applications and their infrastructure items.

An example description of how the 3-D network topology graph is generated is as follows:

The GUI has a graph rendering algorithm which takes the JSON object as input and generates a node set and an edge set accordingly.

A node in the node set is an application, or an infrastructure item related to an application. An edge in the edge set could be of two types:

(1) An edge represents the interface direction of one application to another application:

In this case, the edge's direction will be the interfacing direction between two applications. If both of the two applications rely on each other's output as input, then there will be two directed edges between these two applications, forming a loop.

(2) An edge represents the connection of the infrastructure items:

In this case, the edge will be connecting an application with a server/database/storage device, or between a server and a data center.

After generating the edge set and the node set, the process will use D3.js's force directed graph layout model to generate the 3D network graph.

Example technologies that can be used to develop the network topology graph are listed: JavaScript(D3.js, jQuery); CSS(Bootstrap); Python (flask).

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A computer implemented system for technology incident management for facilitating resolution of a new incident ticket, the system comprising:
 a processor operating in conjunction with computer memory to provide:
 a data receiver configured for receiving string inputs representative of the new incident ticket, the new incident ticket including at least a title field and a description field;
 a pre-processing engine configured to generate a pre-processed concatenated title field and description by concatenating the title field and the description field of the new incident ticket, and to removing low value words from the concatenated title field and description field; and
 a natural language processing engine configured to:
  perform term frequency inverse document frequency analysis on a set of historical incident-solution pairs stored on a data repository and the pre-processed concatenated title field and description to transform the set of historical incident-solution pairs and the pre-processed concatenated title field and description into vector representations, the term frequency inverse document frequency analysis configured for up to 3 word combinations specified by a parameter N-gram range(1,3);
  determine a plurality of cosine similarity scores between a vector representation of the pre-processed concatenated title field and description and vector representations of each of the historical incident-solution pairs;
  generate an ordered list of closest matching historical incidents of the set of historical incident-solution pairs stored on the data repository, ordered by the plurality of cosine similarity scores;
  determine a subset of potential solutions selected from a plurality of potential solutions based on a pre-defined number of closest matching historical incidents from the ordered list of the closest matching historical incidents; and
  generate an output data structure representative of the subset of potential solutions selected from the plurality of potential solutions;
  wherein the output data structure is configured to be utilized to identify one or more prescriptive actions.

2. The system of claim 1, wherein the plurality of cosine similarity scores are further processed to generate one or more corresponding confidence scores.

3. The system of claim 1, wherein the processor is further configured to provide a repository update engine that is configured to periodically retrieve, from one or more incident data storage devices, data elements representing every incident-solution pair that has occurred during a period, process the data elements to concatenate title and description fields of the data element and to remove one or more low value words, and to update the repository with the processed data elements.

4. The system of claim 1, wherein the processor is further configured to provide a decision support graphical user interface rendering engine, the decision support graphical user interface rendering engine configured to generate one or more control signals that control a display of a computing device to render a graphical user interface including at least one or more visual interface elements including textual data corresponding to the output data structure representative of the subset of potential solutions selected from the plurality of potential solutions.

5. The system of claim 4, wherein the string inputs representative of the new incident ticket include natural language strings including at least a portion indicative of an error code, and wherein the graphical user interface is rendered including, for each potential solution of the subset of potential solutions, a first textual graphical element directed to the description string of the incident, a second textual graphical element directed to the title string of the incident, and a third textual graphical element directed to the solution string of the incident.

6. The system of claim 4, wherein a visual characteristic of the first textual graphical element, the second textual graphical element, or the third textual graphical element corresponding to each potential solution is modified based on a cosine similarity score corresponding to the potential solution.

7. The system of claim 6, wherein the visual characteristic is selected from a group consisting of: font size, font color, background color, and opacity level.

8. The system of claim 1, wherein the string inputs representative of the new incident ticket are received from a chatbot interface.

9. The system of claim 1, wherein the low value words are stored on a reference data structure.

10. The system of claim 1, wherein the subset of potential solutions includes potential alternate solutions, the output data structure is representative of the subset of potential solutions ordered based on similarity to the new incident ticket, and the output data structure is configured to be utilized to identify a corrective action based on the subset of potential solutions.

11. A computer implemented method for technology incident management for facilitating resolution of a new incident ticket, the method comprising:
 receiving string inputs representative of the new incident ticket, the new incident ticket including at least a title field and a description field;
 pre-processing the new incident ticket to generate a pre-processed concatenated title field and description by concatenatinq the title field and the description field of the new incident ticket, and removing low value words from the concatenated title field and description field;
 performing term frequency inverse document frequency analysis on a set of historical incident-solution pairs stored on a data repository and the pre-processed concatenated title field and description to transform the set of historical incident-solution pairs and the pre-processed concatenated title field and description into vector representations, the term frequency inverse document frequency analysis configured for up to 3 word combinations specified by a parameter N-qram range(1,3);
 determining a plurality of cosine similarity scores between a vector representation of the pre-processed concatenated title field and description and vector representations of each of the historical incident-solution pairs;
 generating an ordered list of closest matching historical incidents of the set of historical incident-solution pairs stored on the data repository, ordered by the plurality of cosine similarity scores;

determining a subset of potential solutions selected from a plurality of potential solutions based on a pre-defined number of closest matching historical incidents from the ordered list of the closest matching historical incidents; and generating an output data structure representative of the subset of potential solutions selected from the plurality of potential solutions;

wherein the output data structure is configured to be utilized to identify one or more prescriptive actions.

12. The method of claim 11, wherein the plurality of cosine similarity scores are further processed to generate one or more corresponding confidence scores.

13. The method of claim 11, comprising periodically retrieving, from one or more incident data storage devices, data elements representing every incident-solution pair that has occurred during a period, process the data elements to concatenate title and description fields of the data element and to remove one or more low value words, and to update the repository with the processed data elements.

14. The method of claim 11, comprising generating one or more control signals that control a display of a computing device to render a graphical user interface including at least one or more visual interface elements including textual data corresponding to the output data structure representative of the subset of potential solutions selected from the plurality of potential solutions.

15. The method of claim 14, wherein the string inputs representative of the new incident ticket include natural language strings including at least a portion indicative of an error code, and wherein the graphical user interface is rendered including, for each potential solution of the subset of potential solutions, a first textual graphical element directed to the description string of the incident, a second textual graphical element directed to the title string of the incident, and a third textual graphical element directed to the solution string of the incident.

16. The method of claim 14, wherein a visual characteristic of the first textual graphical element, the second textual graphical element, or the third textual graphical element corresponding to each potential solution is modified based on a cosine similarity score corresponding to the potential solution.

17. The method of claim 11, wherein the string inputs representative of the new incident ticket are received from a chatbot interface.

18. The method of claim 11, wherein the low value words are stored on a reference data structure.

19. The method of claim 11, wherein the subset of potential solutions includes potential alternate solutions, the output data structure is representative of the subset of potential solutions ordered based on similarity to the new incident ticket, and the output data structure is configured to be utilized to identify a corrective action based on the subset of potential solutions.

20. A non-transitory computer readable medium storing machine interpretable instructions, which when executed by a processor, cause the processor to perform a computer implemented method for technology incident management for facilitating resolution of a new incident ticket, the method comprising:

receiving string inputs representative of the new incident ticket, the new incident ticket including at least a title field and a description field;

pre-processing the new incident ticket to generate a pre-processed concatenated title field and description by concatenating the title field and the description field of the new incident ticket, and removing low value words from the concatenated title field and description field;

performing term frequency inverse document frequency analysis on a set of historical incident-solution pairs stored on a data repository and the pre-processed concatenated title field and description to transform the set of historical incident-solution pairs and the pre-processed concatenated title field and description into vector representations, the term frequency inverse document frequency analysis configured for up to 3 word combinations specified by a parameter N-gram range(1,3);

determining a plurality of cosine similarity scores between a vector representation of the pre-processed concatenated title field and description and vector representations of each of the historical incident-solution pairs;

generating an ordered list of closest matching historical incidents of the set of historical incident-solution pairs stored on the data repository, ordered by the plurality of cosine similarity scores;

determining a subset of potential solutions selected from a plurality of potential solutions based on a pre-defined number of closest matching historical incidents from the ordered list of the closest matching historical incidents; and generating an output data structure representative of the subset of potential solutions selected from the plurality of potential solutions;

wherein the output data structure is configured to be utilized to identify one or more prescriptive actions.

* * * * *

UNITED STATES PATENT AND TRADEMARK OFFICE
CERTIFICATE OF CORRECTION

PATENT NO. : 10,977,293 B2
APPLICATION NO. : 16/409551
DATED : April 13, 2021
INVENTOR(S) : Yixian Cai et al.

It is certified that error appears in the above-identified patent and that said Letters Patent is hereby corrected as shown below:

In the Claims

Column 27 Line 17 (Claim 1): "and to removing low value words from the concatenated title field and description field; and" should read: -- and removing low value words from the concatenated title field and description field; and --

Column 28 Line 45 (Claim 11): "by concatenatinq the title field and the description field" should read: -- by concatenating the title field and the description field --

Column 28 Line 57 (Claim 11): "word combinations specified by a parameter N-qram" should read: -- word combinations specified by a parameter N-gram --

Signed and Sealed this
Eighteenth Day of June, 2024

Katherine Kelly Vidal
*Director of the United States Patent and Trademark Office*